US010550940B2

(12) United States Patent
Kozak

(10) Patent No.: US 10,550,940 B2
(45) Date of Patent: Feb. 4, 2020

(54) CLOSURE FOR PRESSURE VESSEL OR PIPELINE

(71) Applicant: IN-LINE FLOW PRODUCTS LTD., Edmonton (CA)

(72) Inventor: Keith Alan Kozak, Sherwood Park (CA)

(73) Assignee: In-Line Flow Products Ltd., Edmonton (CA)

( * ) Notice: Subject to any disclaimer, the term of this patent is extended or adjusted under 35 U.S.C. 154(b) by 124 days.

(21) Appl. No.: 15/646,454

(22) Filed: Jul. 11, 2017

(65) Prior Publication Data
US 2018/0010724 A1 Jan. 11, 2018

Related U.S. Application Data

(60) Provisional application No. 62/360,562, filed on Jul. 11, 2016.

(51) Int. Cl.
F16L 55/10 (2006.01)
F17C 13/02 (2006.01)
(Continued)

(52) U.S. Cl.
CPC ............. *F16J 13/24* (2013.01); *E05B 17/20* (2013.01); *E05C 19/00* (2013.01); *E06B 5/12* (2013.01); *F16L 55/1018* (2013.01); *F17C 13/02* (2013.01); *F17C 13/06* (2013.01); *F17C 2205/0311* (2013.01); *F17C 2250/043* (2013.01); *F17C 2250/07* (2013.01)

(58) Field of Classification Search
CPC .... F16L 55/1018; F16L 55/11; F16L 55/1116; F16L 55/115; F16L 55/1157; F16L 45/00; E05B 17/20; E05C 19/00; E06B 5/12; F17C 13/02; F17C 13/06; F17C 2205/0311; F17C 2250/043; F17C 2250/07; F16J 13/18; F16J 13/10; F16J 13/16; F16J 13/24
USPC .............................................. 220/212.5, 316
See application file for complete search history.

(56) References Cited

U.S. PATENT DOCUMENTS 4,515,287 A * 5/1985 Baudoux ................. F16K 27/08
220/316
4,658,529 A 4/1987 Bertolini
(Continued)

FOREIGN PATENT DOCUMENTS

DE 102008011462 9/2009
DE 102012204711 9/2013

Primary Examiner — Andrew D Perreault
(74) Attorney, Agent, or Firm — Dentons US LLP

(57) ABSTRACT

A closure is provided for a pressure vessel or pipelines that can provide quick and easy access to the interior of a pressure vessel or pipeline, and means for a pressure tight seal between the hub and door. The closure can incorporate means for mechanically fastening the door to the hub using an external split clamp ring actuated by a toggle mechanism. A locking mechanism can be provided to safeguard against unintended closure actuation, and provides a layer of redundancy to the holding characteristics of the toggle mechanism. The locking mechanism can be interlocked to a pressure alert system to ensure any differential pressure condition contained within the closure is detected prior to disengaging the locking mechanism and actuating the toggle mechanism.

17 Claims, 25 Drawing Sheets

(51) Int. Cl.
  *E06B 5/12*   (2006.01)
  *E05B 17/20*  (2006.01)
  *F17C 13/06*  (2006.01)
  *E05C 19/00*  (2006.01)
  *F16J 13/24*  (2006.01)

(56) References Cited

U.S. PATENT DOCUMENTS

| | | |
|---|---|---|
| 5,318,509 A | 6/1994 | Agbodoe |
| 7,210,201 B2 | 5/2007 | Maeckle et al. |
| 7,213,848 B2 | 5/2007 | Hagan |
| 7,326,092 B2 | 2/2008 | Fedder et al. |
| 7,850,214 B2 | 12/2010 | Ambriiz |
| 8,402,612 B2 | 3/2013 | Wein et al. |
| 8,540,103 B2 | 9/2013 | Lollis et al. |
| 8,740,208 B2 | 6/2014 | Hagan et al. |
| 8,820,565 B2 | 9/2014 | Akhund et al. |
| 8,967,415 B2 | 3/2015 | Lang et al. |
| 2008/0289380 A1 | 11/2008 | Blattmann |
| 2011/0068590 A1 | 3/2011 | Teng |

* cited by examiner

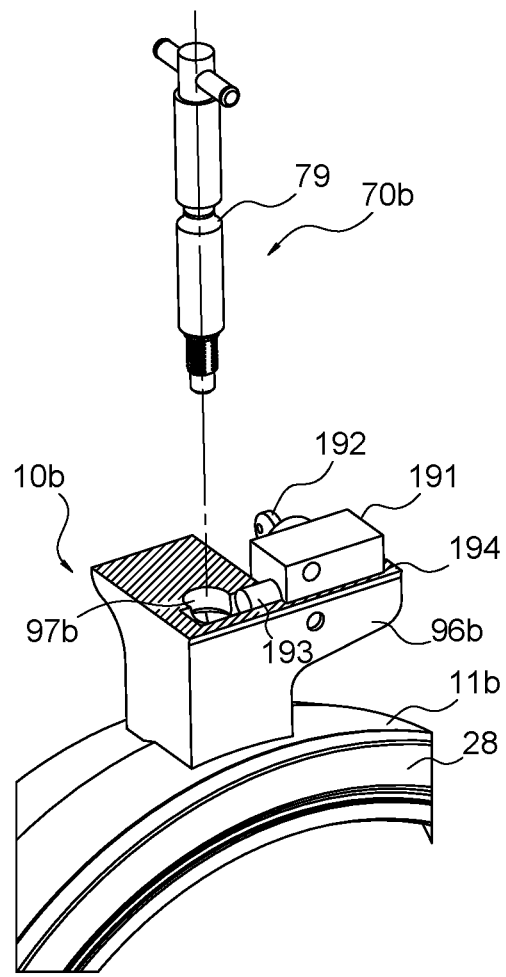
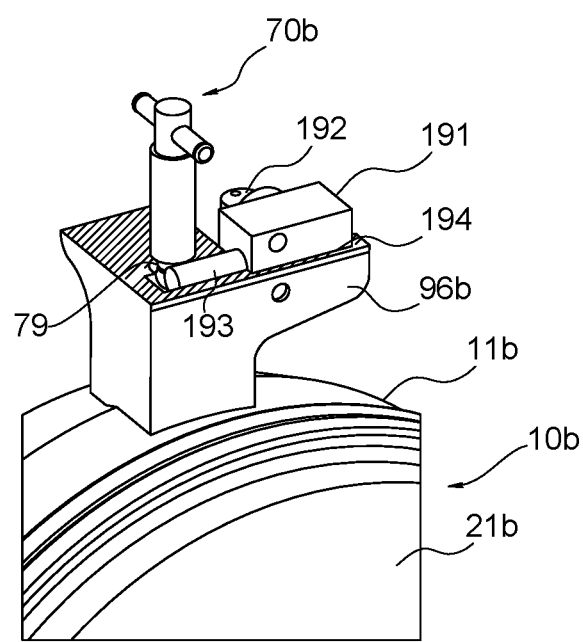
FIG. 18
FIG. 19

CLOSURE FOR PRESSURE VESSEL OR PIPELINE

CROSS-REFERENCE TO RELATED APPLICATIONS

This application claims priority of U.S. provisional patent application Ser. No. 62/360,562 filed Jul. 11, 2016, which is incorporated by reference into this application in its entirety.

TECHNICAL FIELD

The present disclosure is related to the field of quick actuating closures for providing rapid access to, and sealing the end of, a pressure vessel or pipeline, in particular, to clamp-style closures with an improved means of safeguarding against unintentional operation and providing an element of redundancy in retaining the holding elements.

BACKGROUND

There have been many variations in the design of quick actuating closures over the last many decades. Most provide a means for rapid access to a pressure vessel or pipeline as compared to bolted flange connections. They employ various means to seal and support the end load created by internal and external pressures including screw threads whereby external threads on a hub interconnect with the internal threads of the door, conical bands whereby a split or segmented band is actuated into an annular groove between the hub and door, bayonet connections whereby interlocking segments of the hub are engaged with mating segments of the door by partial rotation and clamps whereby a split clamp ring is engaged on raised collar on the hub and door and are held together by toggles, bolts or other mechanisms.

It is, therefore, desirable to provide a quick clamping mechanism that overcomes the shortcomings of the prior art.

SUMMARY

The present disclosure deals with the clamp ring style of closure. In some embodiments, an annular hub can be attached to the mating pressure vessel or pipeline, and can function as an access port to the interior of the pressure chamber. A door can be sized to match the mating dimensions of the hub and provides a means to close access to the pressure vessel or pipeline. In some embodiments, both the hub and door can have a raised annular collar located at each end of their respective contacting surfaces. A hinge arrangement can be attached to both the hub and door to allow for pivoting the contact surfaces of the door to align with the contact surfaces of the stationary hub. After the surfaces are drawn together in opposition, two halves of a split annular ring can be rotated via hinge arrangement over the hub/door flange, with the ends drawn together with a toggle mechanism.

Once the toggle mechanism has been fully actuated, circular openings contained within the toggle linkages, and circular openings within the blocks attaching the toggle mechanism to the split annular ring, can align linearly. This linear arrangement can allow the passage of a locking pin of largely round cross section to pass axially through the circular openings, thereby locking the split annular rings and toggle mechanism in the closed position.

The locking pin described above can contain a circular radial hole offset from one end of the locking pin opposite the portion enclosed by the linearly arranged holes contained within the toggle linkages and blocks. This hole can be aligned perpendicular to the axis of the hub by means of one or more planar surfaces disposed on one or both of the top and the bottom of the locking pin, the one or more planar surfaces orientated parallel to the axis of the hub that pass through a hole contained in a stem housing that is attached radially to the hub. The stem housing can contain a circular hole orientated radially with the hub axis and is concentric to a tapped hole passing completely through the hub wall. A threaded bushing can be installed into the tapped hole and can further contain a centrally located tapped hole to accept a pressure alert stem.

In some embodiments, the pressure alert stem can be sealed against the threaded bushing by means of an elastomer o-ring. The threaded portion of the pressure alert stem can be interrupted by an axial slot extended the entire length of the thread to a depth below the minor diameter of the thread. This can act as a safety feature in that if the interior portion of the hub is under differential pressure, and if an attempt is made to remove the pressure alert stem from the threaded bushing, the seal created by the o-ring would be compromised and the interior pressure contained within the hub would pass unobstructed through the thread groove, alerting the operator of a differential pressure situation with the closure assembly.

When fully assembled, the pressure alert stem can pass through the radial circular hole in the locking pin and the threaded bushing installed in the hub wall. In this position, the pressure alert stem can extend fully through the locking pin, preventing the locking pin from translating linearly through the toggle assembly and subsequently locking the toggle and split annular rings in the closed position. As a consequence, in order to operate the toggle mechanism to open the closure door, the pressure alert stem must be removed completely from the closure assembly in order for the locking pin to be translated linearly out of the toggle hole alignment. This embodiment constitutes a safety feature of the closure in that the pressure alert stem must be removed, thus alerting the operator of differential pressure within the closure hub, before the locking pin can be removed to allow the toggle mechanism to function and, thus, opening the closure door. With the locking pin in the extended position, the locking pin can create an interference within the stem housing preventing the pressure alert stem from being installed into the threaded bushing until the locking pin and toggle assembly are fully engaged in the closed position.

A better understanding of these features can be obtained from the description of the drawings and detailed description of the embodiments that follow.

Broadly stated, in some embodiments, a closure device can be provided for a pressure vessel or a pipeline, the closure device comprising: a hub comprising a central opening configured to correspond to an opening in the pressure vessel or pipeline; a door configured to contact the hub and close access to the hub central opening; a hinge assembly operatively coupling the door to the hub; a split annular ring assembly operatively coupled attached to the hub and further comprising opposing ring sections configured to move between an open position to a closed position, the opposing ring sections each comprising an inner channel configured to engage corresponding flange elements disposed on both the door and the hub; an actuating mechanism configured to cause the split annular ring assembly to engage the flange elements thereby fastening the door to the hub; a locking pin configured to inhibit movement of the actuating mechanism when the actuating mechanism is in a locked position; and a pressure alert assembly operatively coupled to the hub, the pressure alert assembly configured to inhibit movement of the locking pin when the actuating mechanism is in the locked position.

Broadly stated, in some embodiments, the closure device can further comprise a seal disposed between the door and hub.

Broadly stated, in some embodiments, the hub can be configured to be welded or bolted to the pressure vessel or the pipeline.

Broadly stated, in some embodiments, the hinge assembly can further comprise: upper and lower blocks operatively coupled to the door, further comprising a plain pin and a threaded adjustment pin arrangement configured to manipulate a vertical location of the door in relation to the central opening; upper and lower flange plates operatively coupled to the upper and lower blocks on the door, and further comprising a gusset body disposed between the upper and lower flange plates; a hinge shaft; and a hinge adjustment assembly operatively coupling the upper and lower flange plates to the hinge shaft, the hinge adjustment assembly configured to manipulate a position of the door relative to the hub, wherein the hinge assembly can support the door and allow rotation of the door about the hinge shaft.

Broadly stated, in some embodiments, the hinge shaft can comprise an axis that ranges from being substantially vertical to substantially horizontal.

Broadly stated, in some embodiments, the actuating mechanism can further comprise: blocks attached to each of the opposing ring sections, each block comprising a longitudinal through-hole comprising an axis substantially parallel with a plane defined by the split annular ring assembly, wherein the longitudinal through-holes of the blocks substantially align with each other when the opposing ring sections are in the closed position; toggle linkages disposed on anterior and posterior sides of a first of the blocks operatively coupling the first of the blocks to a toggle handle, the toggle handle operatively coupling a second of the blocks to the toggle linkages, the toggle handle configured to move the opposing ring sections between the open and closed positions; and wherein the toggle linkages further comprise second longitudinal through-holes configured to align with the longitudinal through-holes of the blocks when the opposing ring sections are in the closed position.

Broadly stated, in some embodiments, the locking pin can further comprise: a cylindrical member comprising a diameter substantially corresponding to the longitudinal through-holes of the blocks and the toggle linkages, the cylindrical member comprising a largely circular cross-section further comprising at least one planar surface configured to inhibit rotation of the locking pin when disposed in a supporting housing comprising an opening disposed therethrough having a similar cross-section as the locking pin; a bolt hole disposed through the locking pin, the axis of the bolt hole substantially perpendicular to the axis of the locking pin, the bolt hole disposed at a location offset from a first end of the locking pin; a lip of circular cross section disposed at a second end of the locking pin; and a radial handle extending substantially perpendicular from the locking pin near the first end thereof, the radial handle extending along a plane substantially parallel to the at least one planar surface.

Broadly stated, in some embodiments, the bolt hole can be configured for allowing a locking bolt to pass therethrough and prevent the locking pin from moving within the supporting housing.

Broadly stated, in some embodiments, the locking bolt can comprise a pressure alert stem operatively coupled to the hub.

Broadly stated, in some embodiments, the closure device can further comprise a pressure alert assembly comprising: a stem housing operatively coupled to the hub, the stem housing further enclosing a radial hole disposed through the hub to provide communication with an interior of the pressure vessel or the pipeline; a threaded bushing disposed in the radial hole, the threaded bushing configured to threadably receive an interrupted thread of a pressure alert stem, the threaded bushing further comprising a sealing surface to contact an o-ring seal disposed on the pressure alert stem; and a third longitudinal through-hole disposed through the annular external housing, the third longitudinal through-hole substantially aligned with the longitudinal through-holes of the blocks and with the second longitudinal through-hole when the opposing ring sections are in the closed position.

Broadly stated, in some embodiments, the closure device can further comprise the locking pin disposed in the longitudinal through-holes when the opposing ring sections are in the closed position, the locking pin further comprising a stem hole disposed through the locking pin, the axis of the stem hole substantially perpendicular to the axis of the locking pin, the stem hole disposed at a location offset from a first end of the locking pin and configured to have the pressure alert stem pass therethrough when the pressure alert stem is threaded into the threaded bushing thereby preventing the locking pin from being removed from the longitudinal through-holes without first removing the pressure alert stem from the threaded bushing.

Broadly stated, in some embodiments, the interrupted thread can be configured to close off communication to the interior of the pressure vessel or the pipeline when the pressure alert stem is fully threaded and seated in the threaded bushing, and to provide communication to the interior of the pressure vessel or the pipeline when the pressure alert stem is at least partially unthreaded from the threaded bushing.

Broadly stated, in some embodiments, the pressure alert stem can comprise a tee-shaped handle.

Broadly stated, in some embodiments, the pressure alert assembly can further comprise a key lock assembly comprising a retractable locking pin configured to engage a circumferential groove disposed around the pressure alert stem.

Broadly stated, in some embodiments, the hinge assembly can further comprise: upper and lower bearing blocks operatively coupled to the hub; a substantially vertical hinge shaft disposed between and at least partially through each of the upper and lower bearing blocks, the hinge shaft comprising an upper threaded end and a lower threaded end, each of the upper and lower threaded ends comprising upper and lower threaded fasteners, respectively, the threaded fasteners configured to retain the hinge shaft to the upper and lower bearing blocks; a hinge arm comprising a first end operatively coupled to the door, and a second end rotatably disposed about the hinge shaft; one or more stop collars disposed on the hinge shaft, the one or more stop collars configured to lock the second end of the hinge arm in a fixed position on the hinge shaft; and a hinge adjustment assembly configured to manipulate a vertical position of the door relative to the hub, wherein the hinge adjustment assembly can support the door, and wherein the hinge adjustment assembly further comprises the upper and lower threaded fasteners, wherein rotating the upper threaded fastener adjusts the vertical position of the door relative to the upper and lower bearing blocks, and wherein rotating the lower threaded fasteners locks or unlocks the vertical position of the door relative to the upper and lower bearing blocks.

BRIEF DESCRIPTION OF THE DRAWINGS

FIG. 15a is a perspective view depicting a pressure alert stem for use with the closure assembly of FIG. 1a.

FIG. 16a is a perspective view depicting a locking pin for use with the closure assembly of FIG. 1a.

FIG. 18 is a partial cutaway, front perspective view depicting the closure assembly of FIG. 14b with the pressure alert stem prior to being inserted therein.

FIG. 19 is partial cutaway, front perspective view depicting the closure assembly of FIG. 18 with the pressure alert stem inserted and locked thereto.

DETAILED DESCRIPTION OF EMBODIMENTS

Figure 1A:
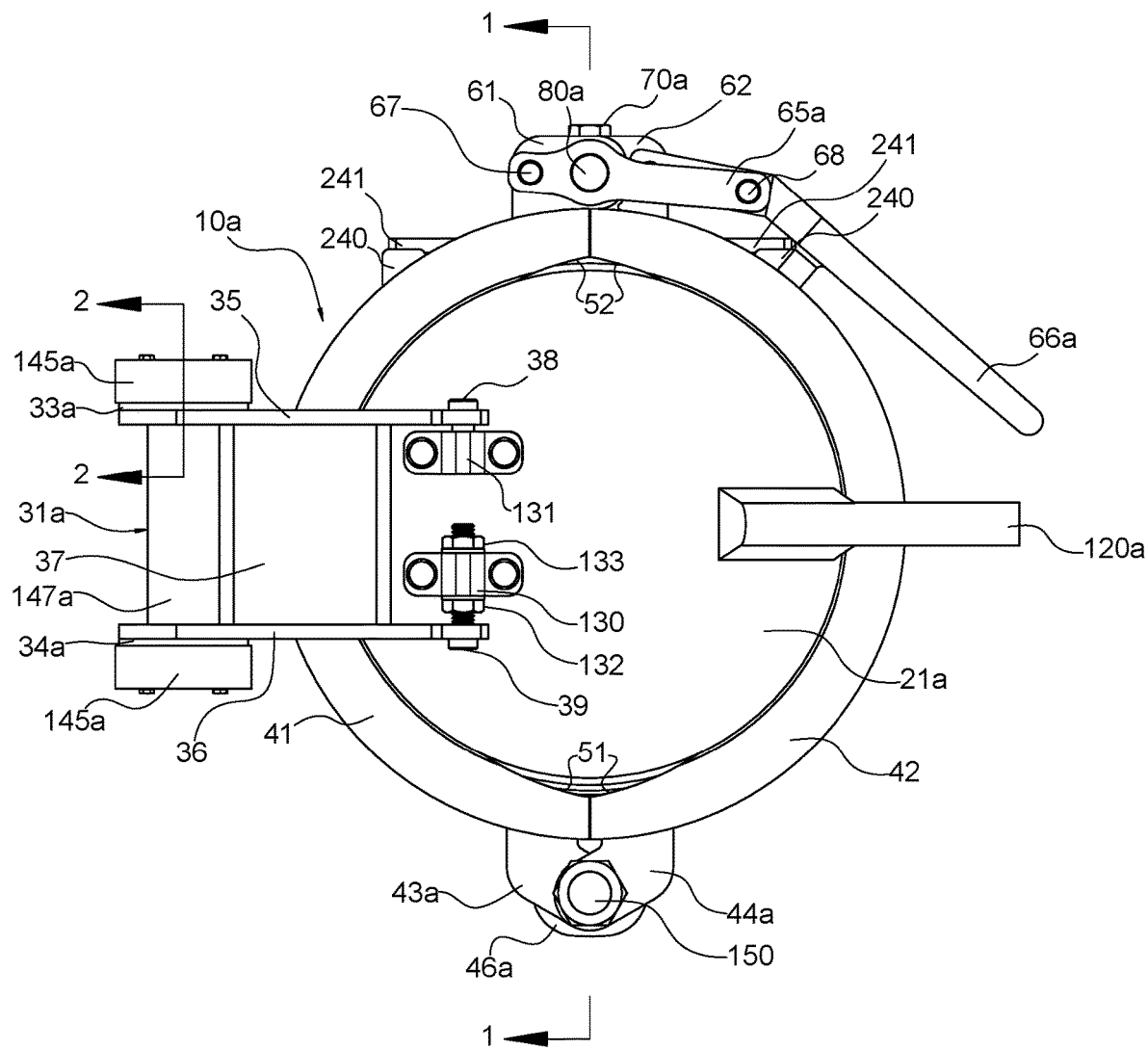
FIG. 1a is a front elevation view depicting one embodiment of a closure assembly in its locked and closed position.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Illustrated in this specification are two embodiments of closure assembly 10. A first embodiment is illustrated in the figures labeled with an "a" suffix, that is: 1a, 2a, etc. A second embodiment is illustrated in the figures with a "b" suffix, that is: 1b, 2b, etc. Reference characters for elements or features specific to the first embodiment are appended with the "a" suffix, whereas reference characters for elements or features specific to the second embodiment are appended with the "b" suffix. Reference characters for elements or features that are common to the first and second embodiments have no "a" or "b" suffix.

Figure 2A:
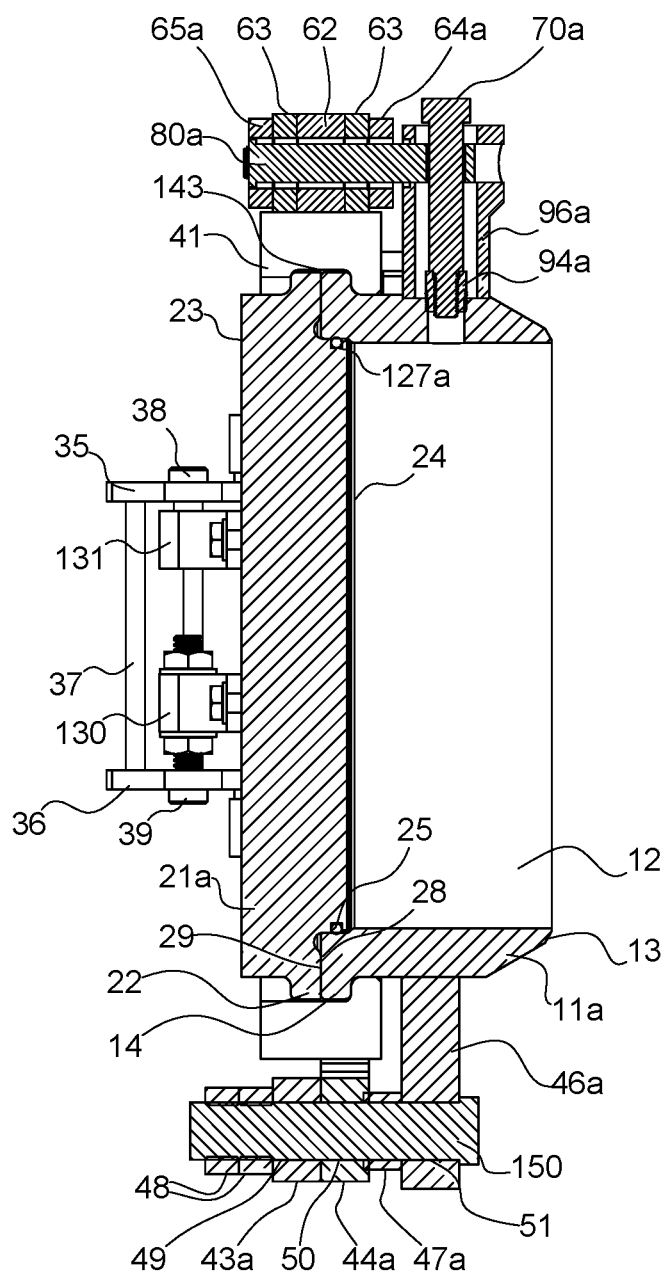
FIG. 2a is a side elevation cross-section view depicting the closure assembly of FIG. 1a along section lines 1-1.

Referring to FIGS. 1a and 2a, a first embodiment of a clamp style closure device for a pressure vessel or pipeline is shown. In some embodiments, closure assembly 10a can comprise hub 11a, which can be adapted to be attached to pressure vessel opening (not shown) or end of pipe (not shown) by welding with use of an appropriately sized bevel 13 located on the posterior portion of hub 11a matching that of the pressure vessel opening or pipe end. On the anterior end of hub 11a, male flange 14 can be provided extending outwardly from the body and circumferentially around the hub edge. Hub 11a can comprise circular bore 12, which can define the central axis of the closure assembly.

In some embodiments, door 21a can be pivotally attached to hub 11a via hinge mechanism 31a for opening and closing closure assembly 10a. In some embodiments, door 21a can be circular in configuration with male flange 22 that is matched dimensionally with male flange 14 of hub 11a. Anterior end 23 and posterior end 24 of door 21a can be planar and parallel. Door 21a can comprise groove 127a offset from posterior end 24 of door 21a in a gland-type configuration that can accept elastomer seal 25 in the form of an o-ring or other configuration that can create a pressure tight seal between hub 11a and door 21a. In some embodiments, the axis of sealing surface 27 of hub 11a can be concentric with that of hub 11a, and can be inclined between zero degrees (parallel to hub bore 12) and fifteen degrees to better accept the seal contained within door 21a.

Figure 1B:
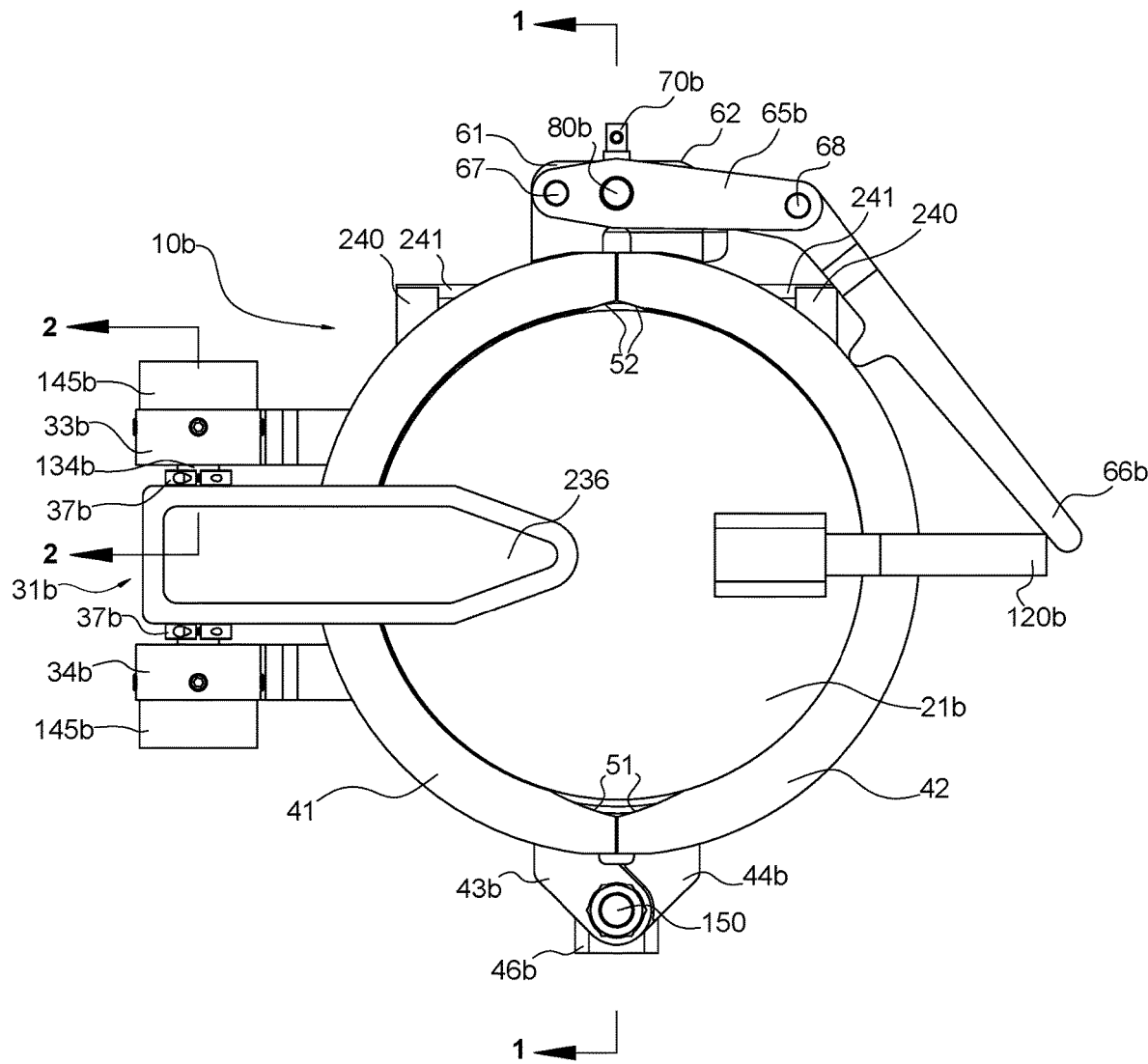
FIG. 1b is a front elevation view depicting a second embodiment of a closure assembly in its locked and closed position.
Figure 2B:
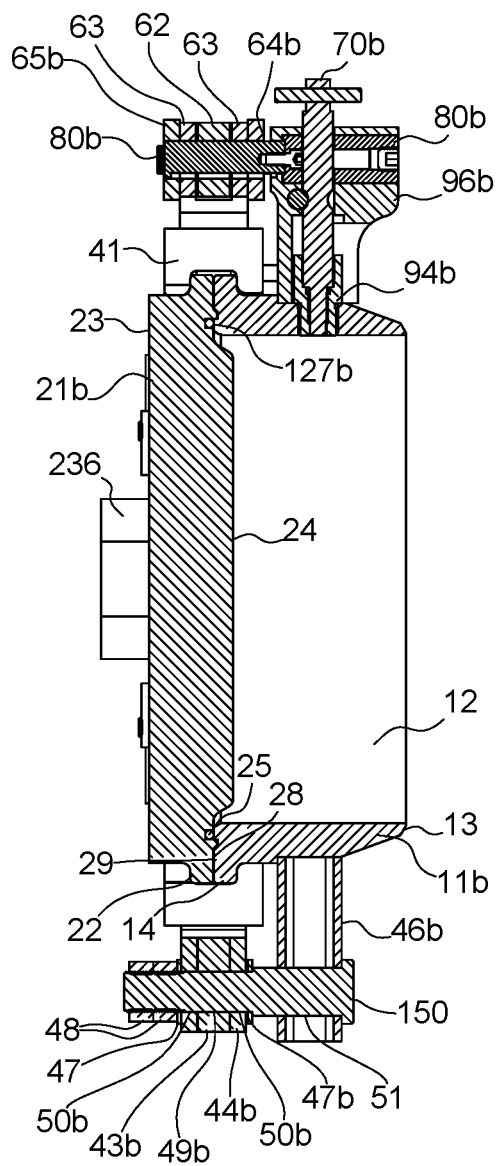
FIG. 2b is a side elevation cross-section view depicting the closure assembly of FIG. 1b along section lines 1-1.
Figure 3A:
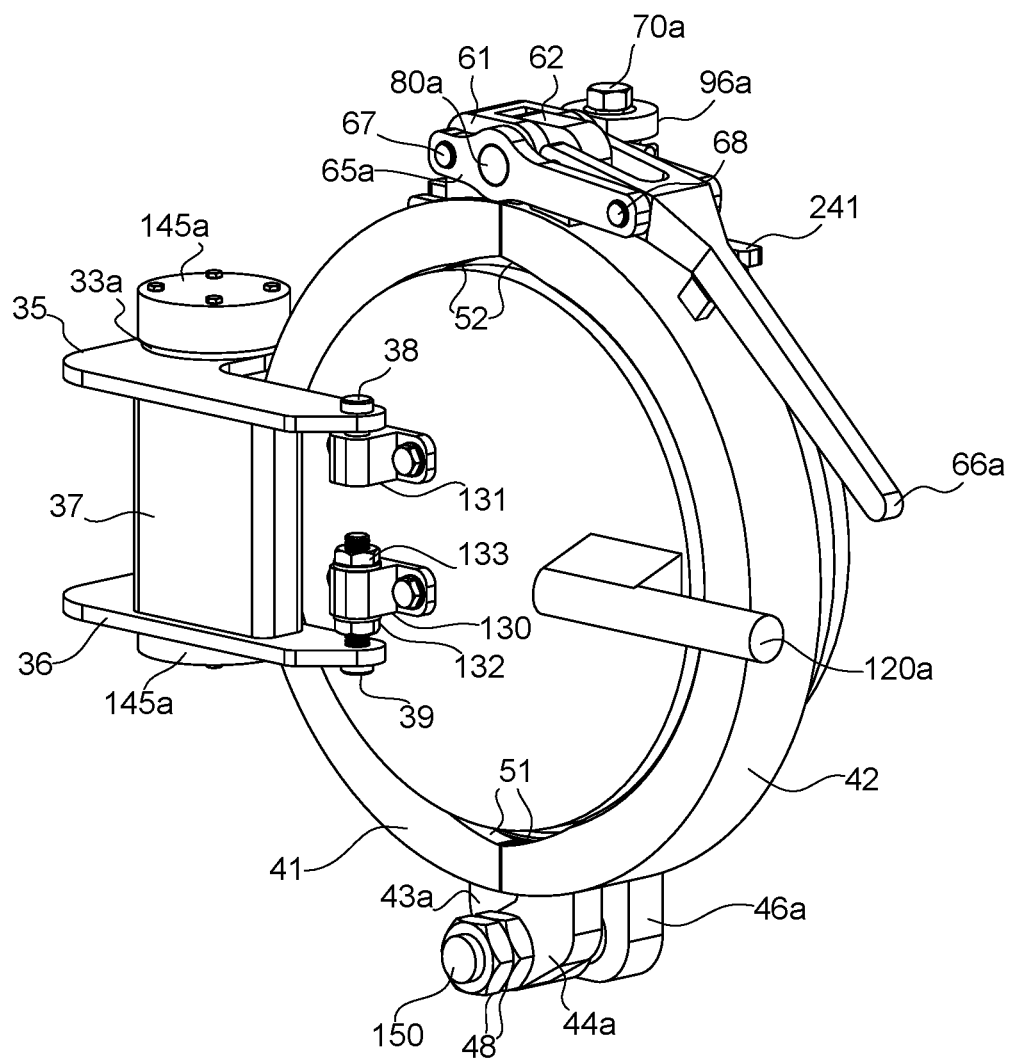
FIG. 3a is a front perspective view depicting the closure assembly of FIG. 1a in a locked and closed position.
Figure 3B:
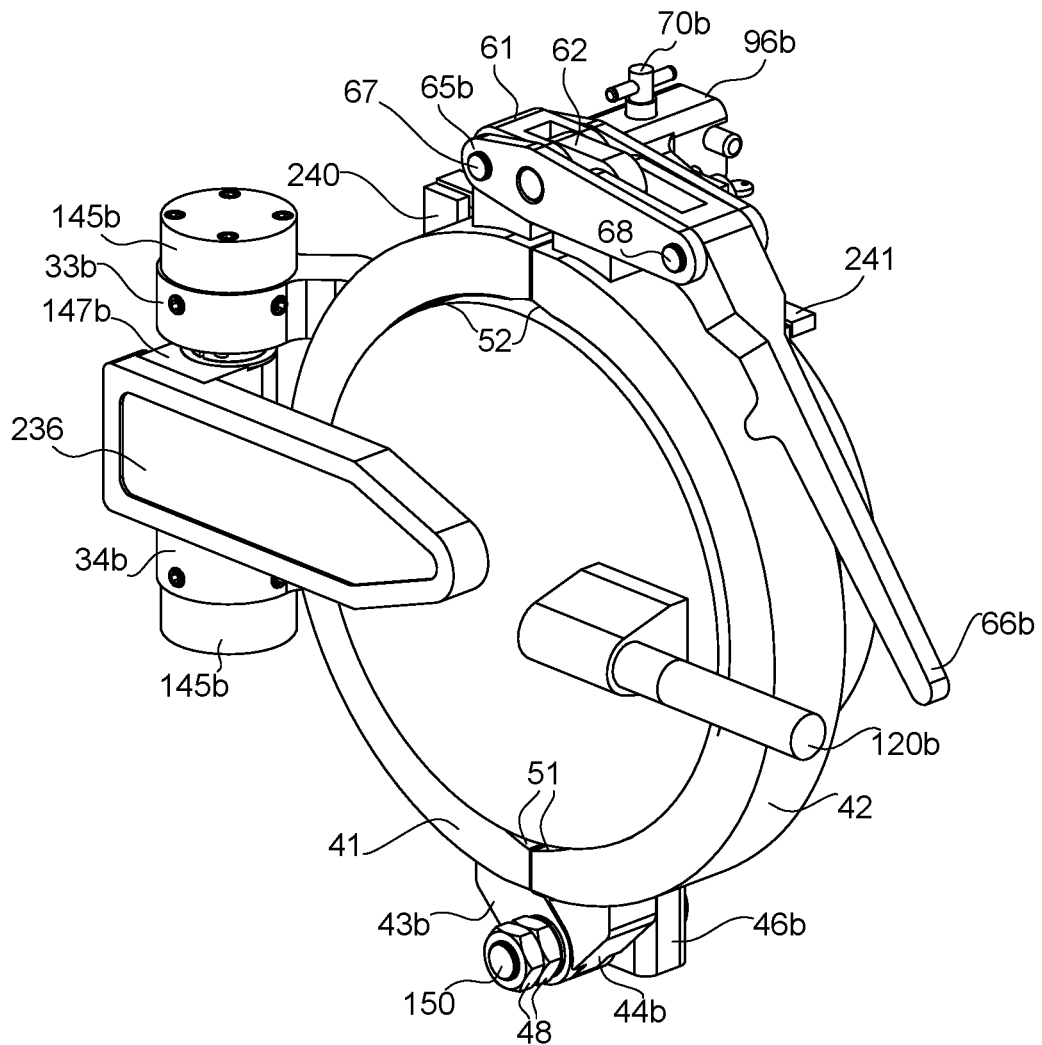
FIG. 3b is a front perspective view depicting the closure assembly of FIG. 1b in a locked and closed position.
Figure 4A:
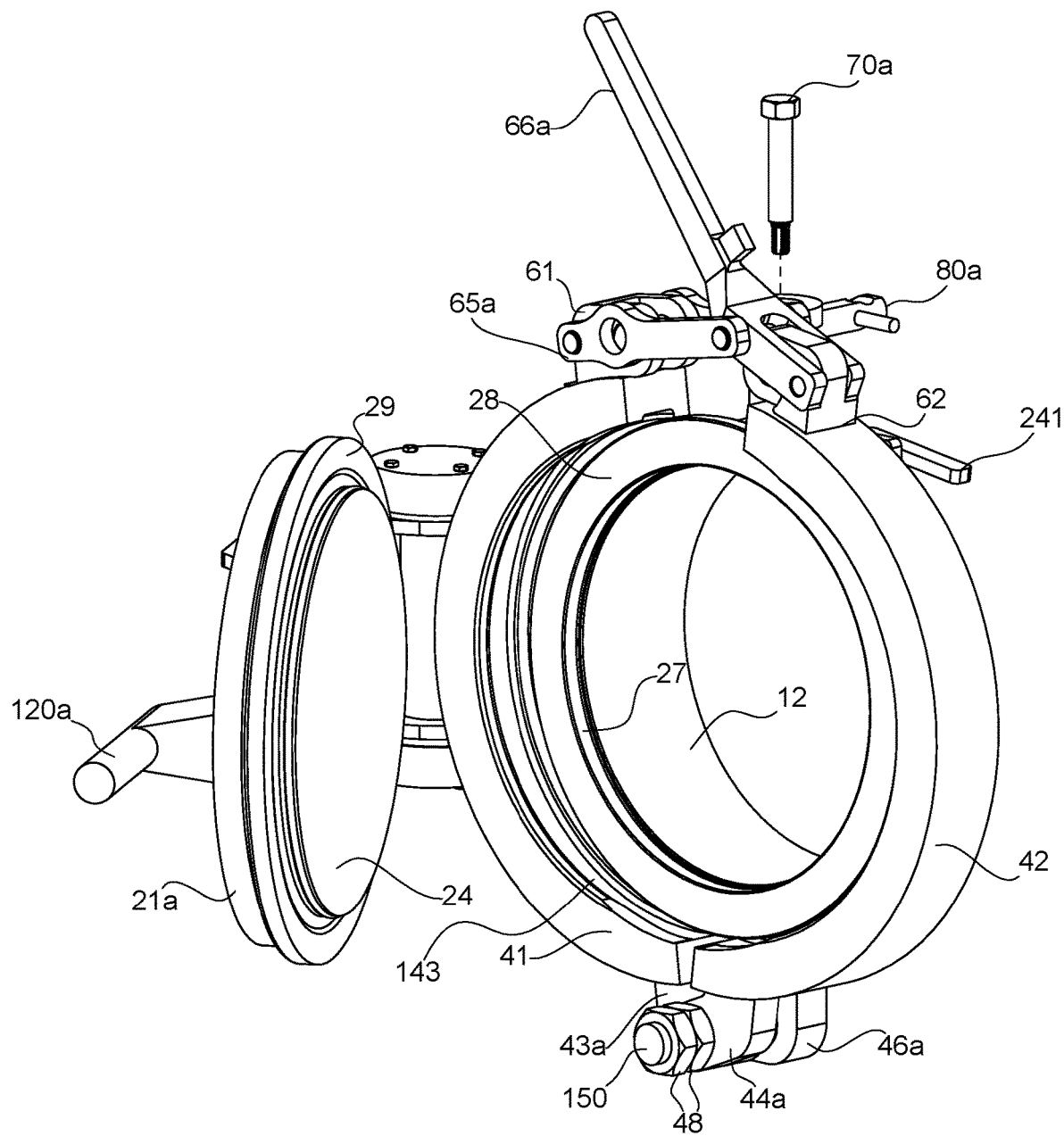
FIG. 4a is a front perspective view depicting the closure assembly of FIG. 1a in an unlocked and open position.
Figure 4B:
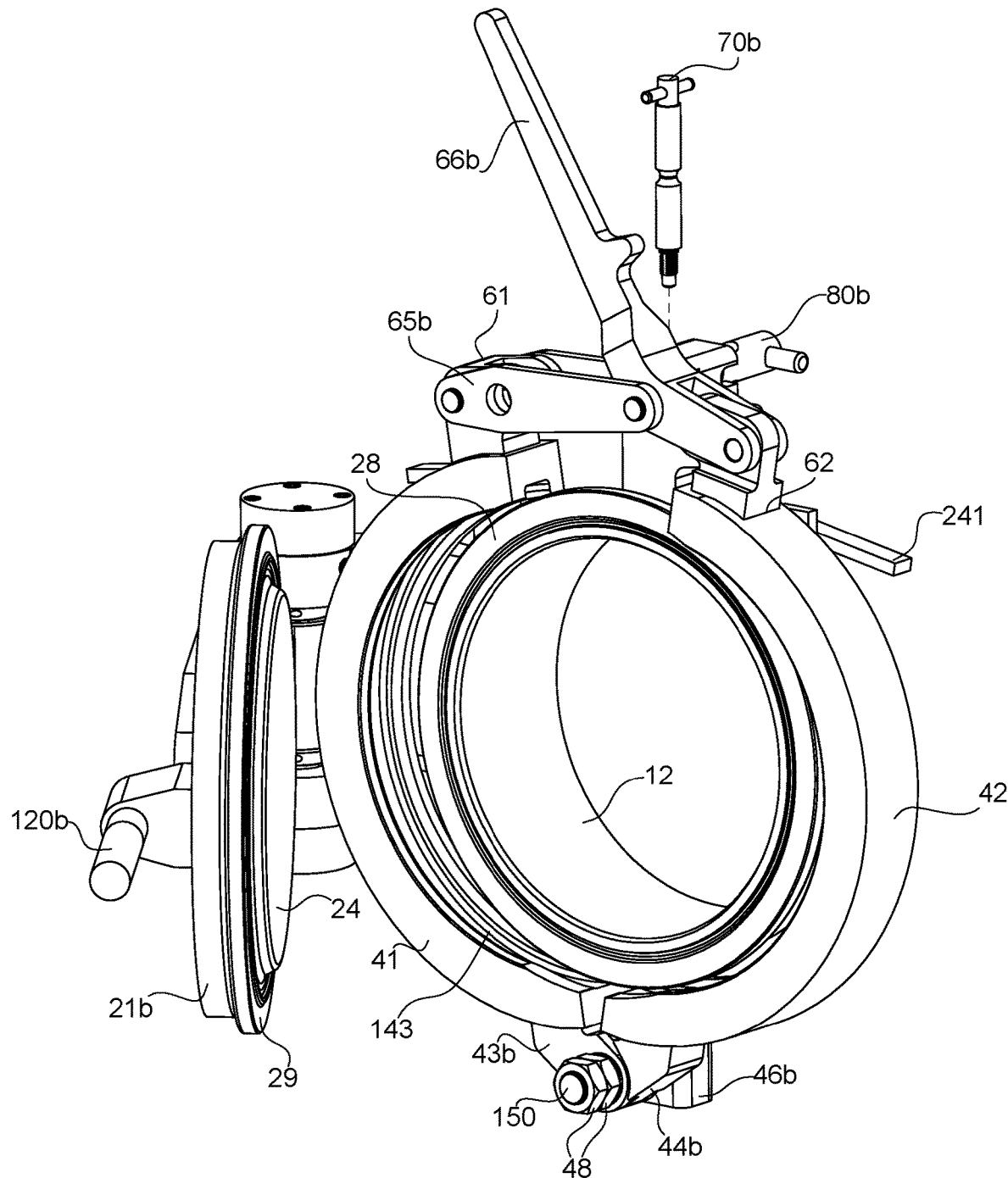
FIG. 4b is a front perspective view depicting the closure assembly of FIG. 1b in an unlocked and open position.
Figure 5A:
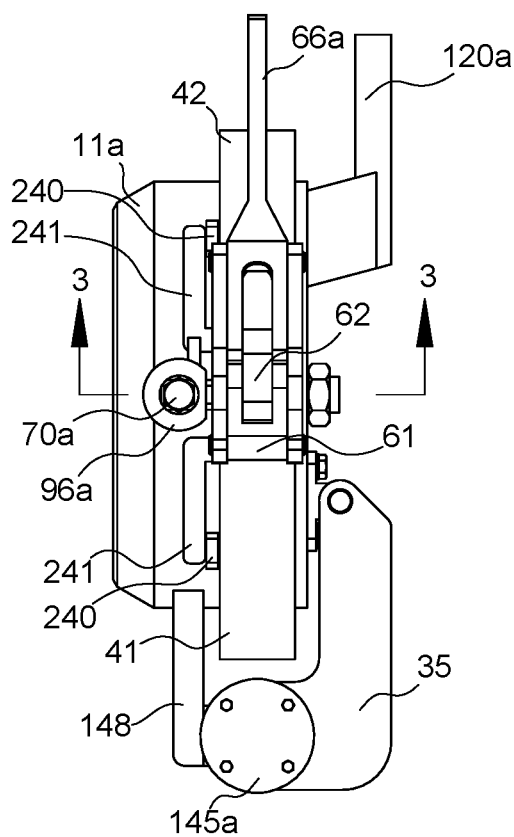
FIG. 5a is a top plan view depicting the closure assembly of FIG. 1a in its locked and closed position.
Figure 6A:
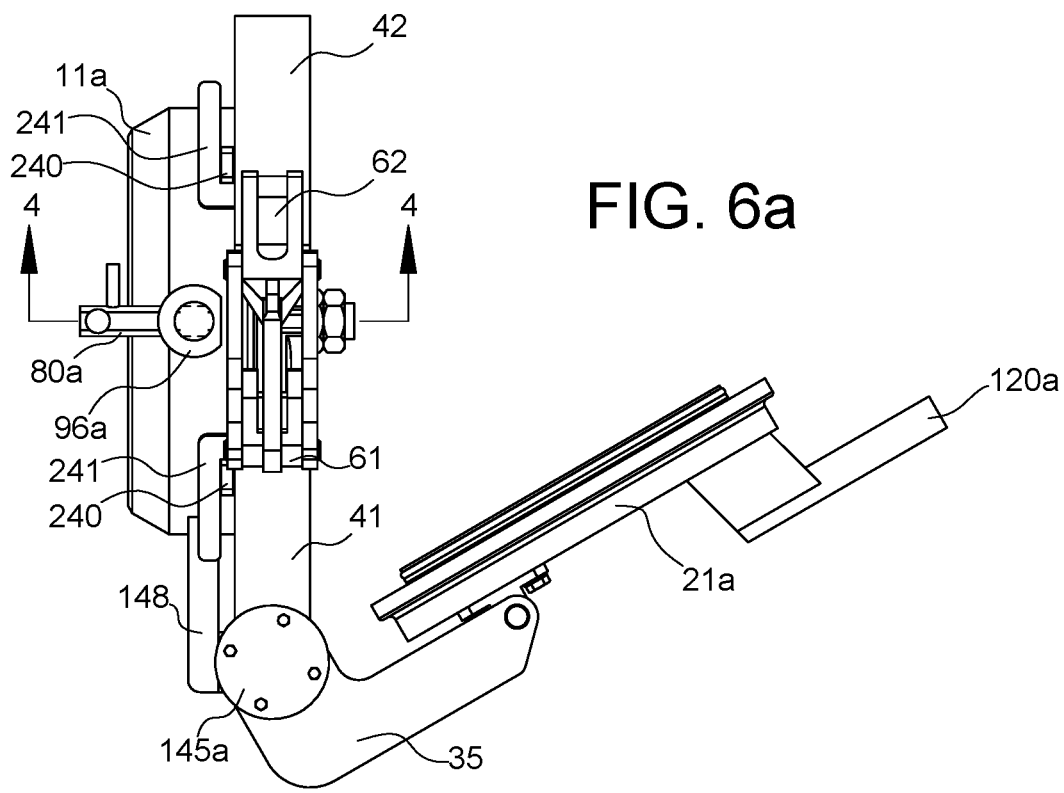
FIG. 6a is a top plan view depicting the closure assembly of FIG. 1a in an unlocked and open position.
Figure 5B:
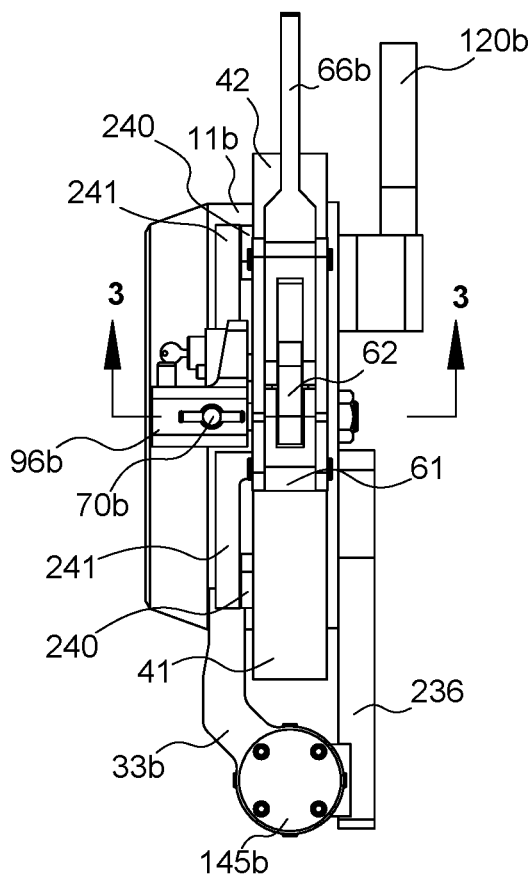
FIG. 5b is a top plan view depicting the closure assembly of FIG. 1b in its locked and closed position.
Figure 6B:
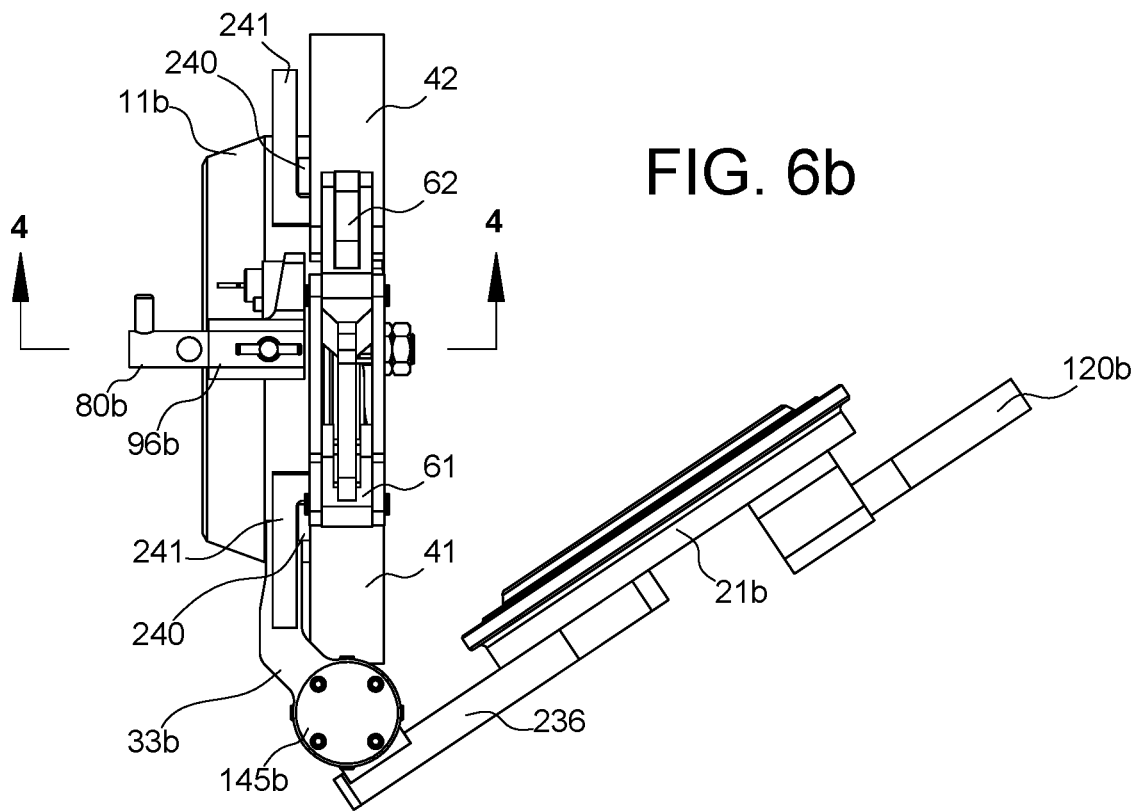
FIG. 6b is a top plan view depicting the closure assembly of FIG. 1b in an unlocked and open position.

Referring to FIGS. 1b and 2b, a second embodiment of a clamp style closure device for a pressure vessel or pipeline is shown. In some embodiments, closure assembly 10b can comprise hub 11b, which can be adapted to be attached to pressure vessel opening (not shown) or end of pipe (not shown) by welding with use of an appropriately sized bevel 13 located on the posterior portion of hub 11b matching that of the pressure vessel opening or pipe end. On the anterior end of hub 11b, male flange 14 can be provided extending outwardly from the body and circumferentially around the hub edge. Hub 11b can comprise circular bore 12, which can define the central axis of the closure assembly.

In some embodiments, door 21b can be pivotally attached to hub 11b via hinge mechanism 31b for opening and closing closure assembly 10b. In some embodiments, door 21b can be circular in configuration with male flange 22 that is matched dimensionally with male flange 14 of hub 11b. Anterior end 23 and posterior end 24 of door 21b can be planar and parallel. Door 21b can comprise groove 127b offset from posterior end 24 of door 21b in a face-type configuration that can accept elastomer seal 25 in the form of an o-ring or other configuration that can create a pressure tight seal between hub 11b and door 21b. In some embodiments, the plane of sealing surface 28 of hub 11b can be substantially perpendicular to the axis of hub bore 12, and can be further inclined between zero degrees and fifteen degrees (relative to the normal of the axis of hub bore 12) to better accept the seal contained within door 21b.

FIGS. 1a to 6a illustrate two halves of split annular ring 41 and 42, for use with closure assembly 10a, that can be split equally with a vertical plane passing through the axis of hub 11a. Pivot blocks 43a and 44a can be attached to the bottom portion of split annular ring 41 and 42, which can contain through holes 49 and 50, respectively. In some embodiments, hub pivot block 46a can be attached to the bottom of the outer surface of hub 11a with circular hole 51 parallel to the axis of hub 11a. In some embodiments, the alignment of holes 49, 50 and 51 can be such that pivot pin 150 can pass axially through all holes and allow the two halves of split annular ring 41 and 42 to rotate about the axis of pivot pin 150. Pivot pin 150 can comprise external threads for installation of jam nuts 48 to secure the split annular ring assembly in place. In some embodiments, spacer cylinder 47a can be installed between pivot block 44a and hub pivot block 46a to maintain alignment of split annular ring 41 and 42, mating hub flange 14 and door flange 22.

Figure 11A:
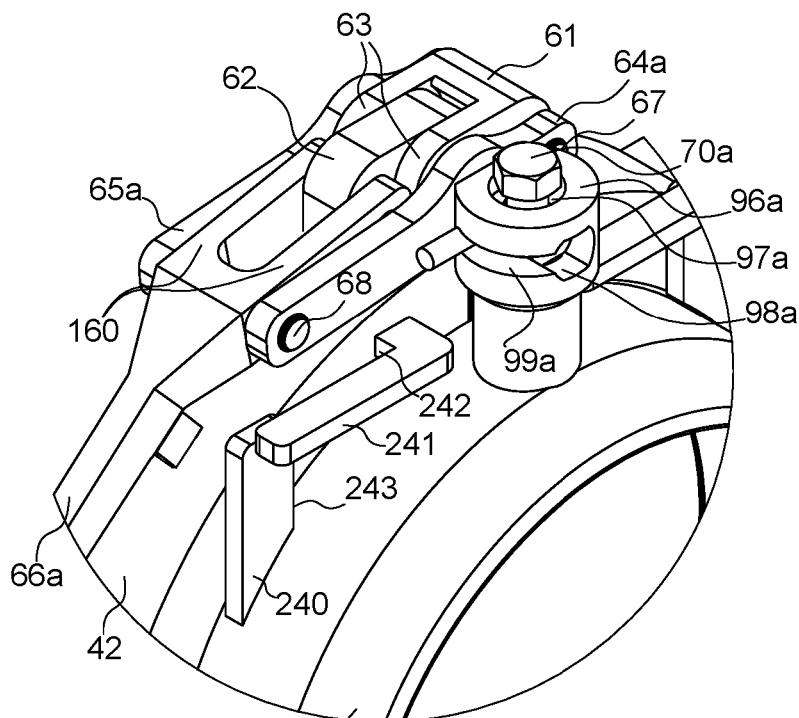
FIG. 11a is a close-up perspective view depicting the toggle mechanism/locking pin arrangement of the closure assembly of FIG. 1a in a closed and locked position, as viewed from the posterior end.

To maintain planar movement of split annular ring 41 and 42 about hub contact face 28, guide bar 240 can attach to the outer periphery of hub 11a and can be captured within a slot created by the attachment of guide bar 241 and the posterior face of split annular ring 41 and 42. As split annular ring 41 and 42 advances to the open position, surfaces 242 and 243, as shown in FIG. 11a, can come into contact and limit the movement of split annular ring 41 and 42 about pivot pin 150. In some embodiments, one set of guide bars 240, 241 can be mirrored about hub 11a vertical plane for each split annular ring 41 and 42.

FIGS. 1b to 6b illustrate two halves of split annular ring 41 and 42, for use with closure assembly 10b, that can be split equally with a vertical plane passing through the axis of hub 11b. Pivot blocks 43b and 44b can be attached to the bottom portion of split annular ring 41 and 42, which can contain through holes 49b and 50b, respectively. In some embodiments, hub pivot block 46b can be attached to the bottom of the outer surface of hub 11b with circular hole 51 parallel to the axis of hub 11b. In some embodiments, the alignment of holes 49b, 50b and 51 can be such that pivot pin 150 can pass axially through all holes and allow the two halves of split annular ring 41 and 42 to rotate about the axis of pivot pin 150. Pivot pin 150 can comprise external threads for installation of jam nuts 48 to secure the split annular ring assembly in place. In some embodiments, spacer washer 47b can be installed between pivot block 44b and pivot pin 150 to maintain alignment of split annular ring 41 and 42, mating hub flange 14 and door flange 22.

Figure 11B:
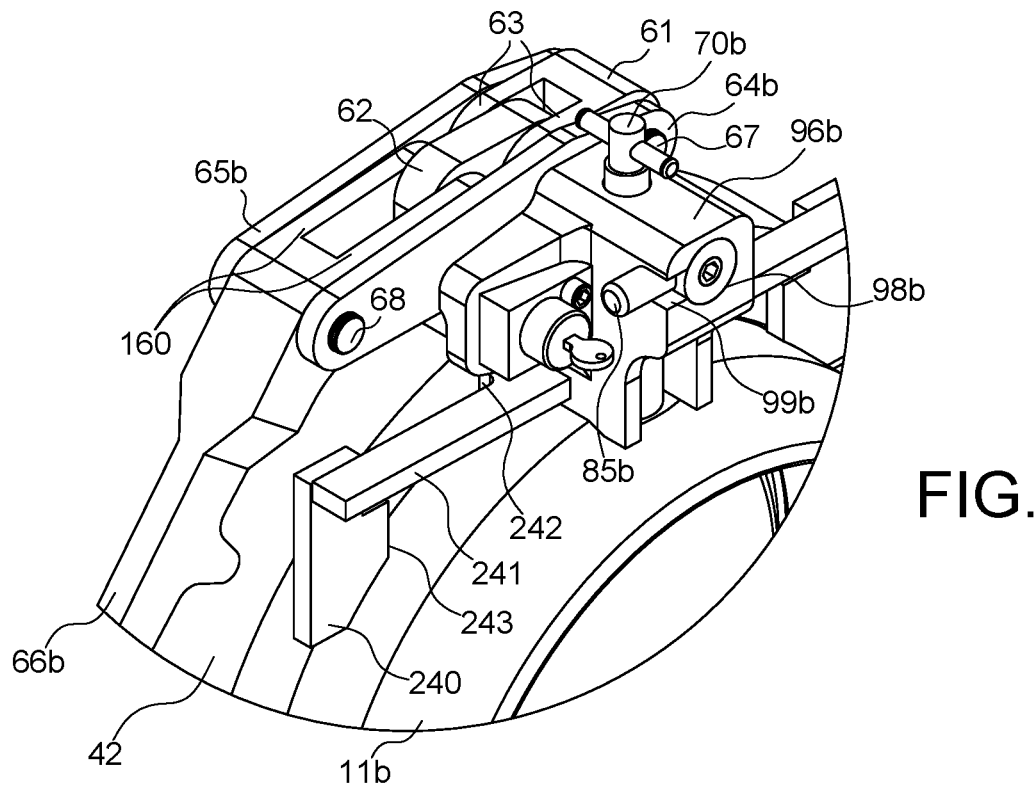
FIG. 11b is a close-up perspective view depicting the toggle mechanism/locking pin arrangement of the closure assembly of FIG. 1b in a closed and locked position, as viewed from the posterior end.

To maintain planar movement of split annular ring 41 and 42 about hub contact face 28, guide bar 240 can attach to the outer periphery of hub 11b and can be captured within a slot created by the attachment of guide bar 241 and the posterior face of split annular ring 41 and 42. As split annular ring 41 and 42 advances to the open position, surfaces 242 and 243, as shown in FIG. 11b, can come into contact and limit the movement of split annular ring 41 and 42 about pivot pin 150. In some embodiments, one set of guide bars 240, 241 can be mirrored about hub 11b vertical plane for each split annular ring 41 and 42.

Referring to FIGS. 3a, 3b, 4a and 4b, in some embodiments, split annular ring 41 and 42 can act as a means for drawing hub male flange 14 and door male flange 22 together to facilitate contact between hub contact face 28 and door contact face 29 when rotated into the closed position about pivot pin 150. Split annular ring 41 and 42 can comprise inner channel 143 concentric to hub bore 12 that is wide enough to accept both the axial width of hub male flange 14 and door male flange 22. In some embodiments, the sides of inner channel 143, and the corresponding contact sides of hub male flange 14 and door male flange 22 can be parallel. The included contact angle between opposing sides of inner channel 143 can vary from zero degrees to 10 degrees. In some embodiments, split annular ring 41 and 42 can comprise clearance arcs 51 and 52, which can further comprise of circular sectors of a diameter exceeding the outer diameter of door male flange 22 as they are projected on split annular ring 41 and 42 in the open position. In some embodiments, arcs 51 and 52 can extend through the anterior outer surface of split annular ring 41 and 42 up to inner channel 143, which can contact male flange 22.

Figure 7A:
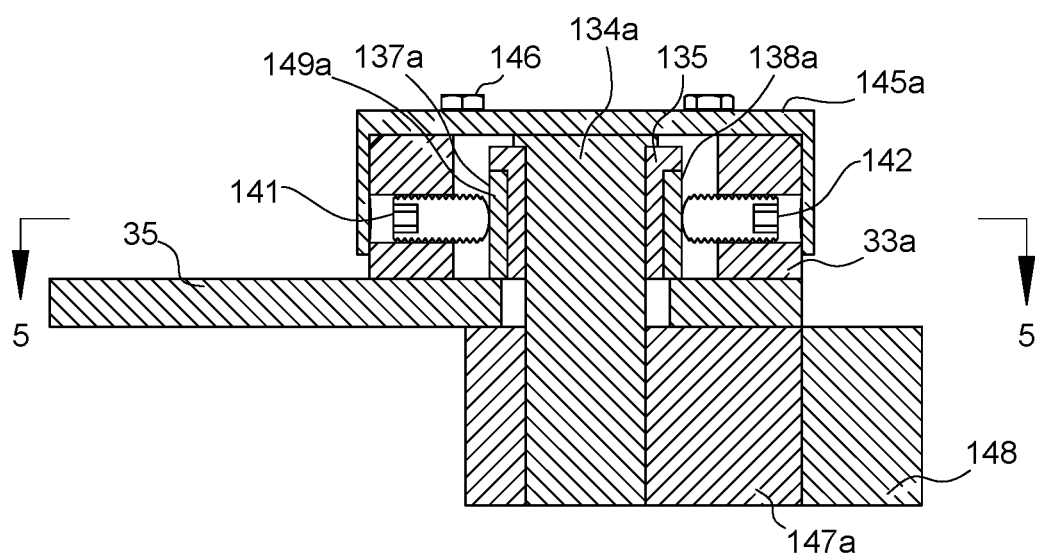
FIG. 7a is a side elevation cross-section view depicting a hinge of the closure assembly of FIG. 1a along section lines 2-2.
Figure 8A:
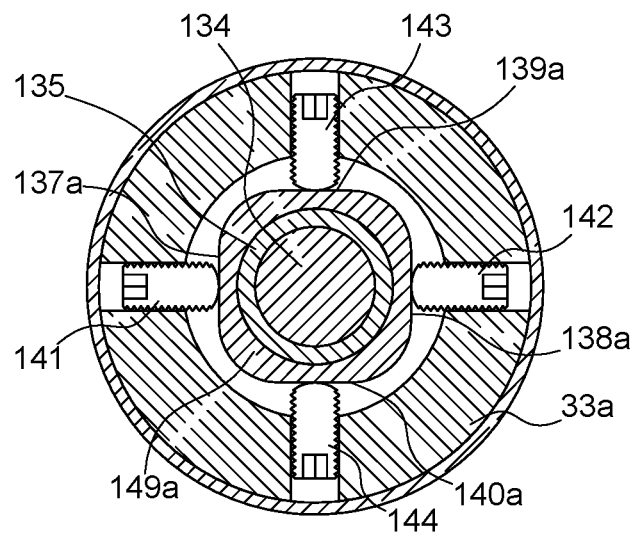
FIG. 8a is a top plan cross-section view depicting the hinge of FIG. 7a along section lines 5-5.

Referring to FIGS. 1a, 7a and 8a, in some embodiments of closure assembly 10a, hinge assembly 31a can be provided as a means to support the weight of door 21a during opening and closing operations and, additionally, to allow door 21a to be pivoted about the vertical axis of hinge shaft 134a to facilitate access to hub bore 12 by employing use of door handle 120a. Hinge assembly 31a can comprise upper and lower bearing blocks 33a and 34a, respectively, that can be affixed to the exterior of mounting plates 35 and 36, respectively. In some embodiments, mounting plates 35 and 36 can be affixed by cross member 37 to maintain parallelism between mounting plates 35 and 36. Mounting plates 35 and 36 can comprise two opposing and axial holes that can accept adjustment pin 38 into upper mounting plate 35, and adjustment bolt 39 into lower mounting plate 36. In some embodiments, adjustment pin 38 and adjustment bolt 39 can be installed into holes of adjustment blocks 131 and 130, respectively. Door 21a positioning within the vertical plane can be achieved by raising or lowering adjustment bolt 39 by rotating jam nuts 132 and 133.

With reference to FIGS. 7a and 8a, upper and lower bearing blocks 33a and 34a (lower bearing block 34a not shown), can be attached to mounting plates 35 and 36, respectively (mounting plate 36 not shown), and can pivot about the axis of hinge shaft 134a. Hinge shaft 134a can be supported by means of circular upper bearing 135 disposed in upper bearing block 33a, and lower bearing 136 disposed in lower bearing block 34a (not shown). In some embodiments, the bearings can comprise plain bearings or mechanical bearings, such as roller bearings, ball bearings or tapered bearings. The bearings can be supported axially within the circular center cavity of bearing carrier 149a. The outside of bearing carrier 149a can comprise of oppositely arranged planar edges 137a, 138a, 139a and 140a. In some embodiments, upper and lower bearing blocks 33a and 34a can comprise oppositely arranged screws 141, 142, 143 and 144 located with threaded holes arranged radially with hinge shaft 134a axis that can contact edges 137a, 138a, 139a and 140a. By loosening and alternately tightening opposing screws 141, 142, 143 and 144, axis hinge shaft 134a and, by extension, door contact face 29, can be tilted in minute increments to achieve parallelism between hub contact face 28 and door contact face 29, and concentricity between the circular outer edges of hub male flange 14 and door male flange 22. In some embodiments, circular dished cap 145a can be installed over upper and lower bearing blocks 33a and 34a and be retained by a plurality of screws 146. In some embodiments, hinge shaft 134a can be retained within hinge 147a. Hinge 147a can be attached to hinge block 148, which can also be attached to the outer periphery of hub 11, parallel to the horizontal plane cutting the axis of hub 11a.

Figure 7B:
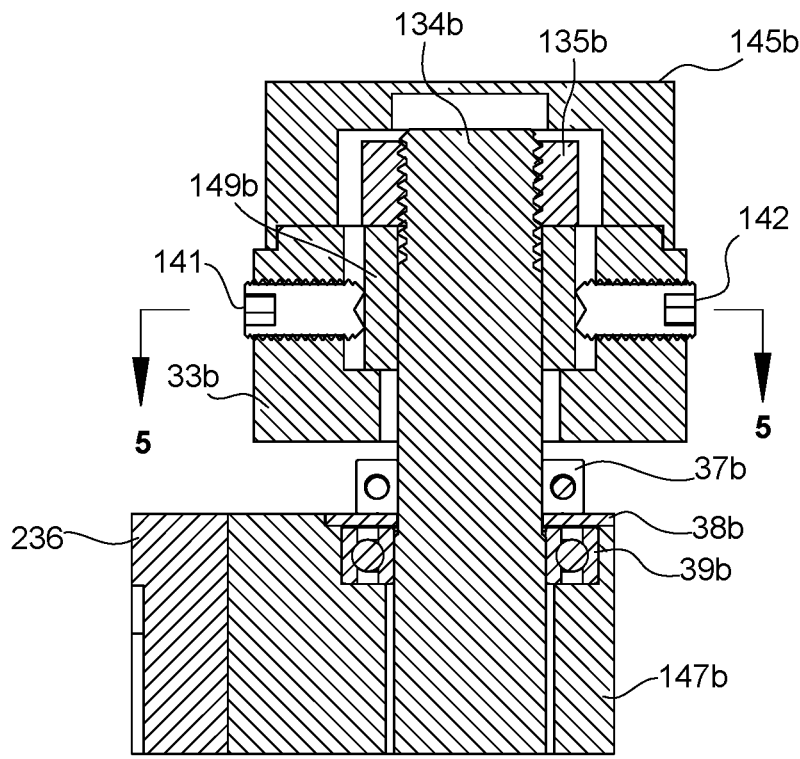
FIG. 7b is a side elevation cross-section view depicting a hinge of the closure assembly of FIG. 1b along section lines 2-2.
Figure 8B:
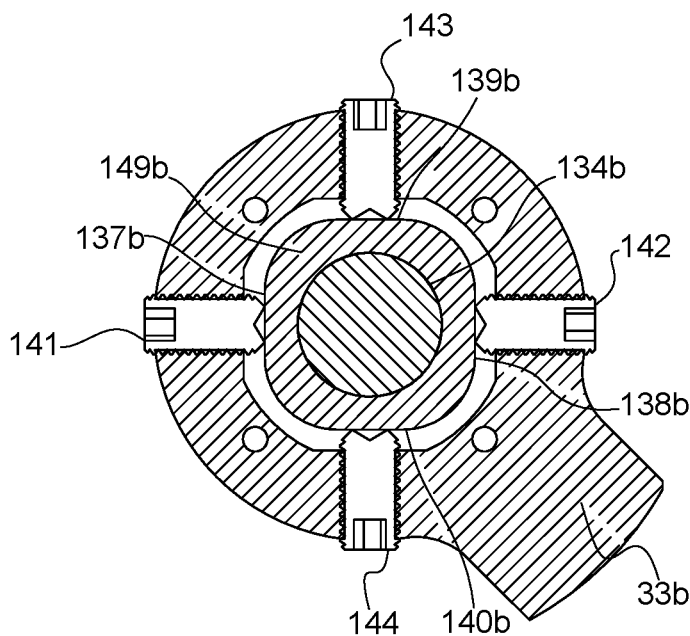
FIG. 8b is a top plan cross-section view depicting the hinge of FIG. 7b along section lines 5-5.

Referring to FIGS. 1b, 7b and 8b, in some embodiments of closure assembly 10b, hinge assembly 31b can be provided as a means to support the weight of door 21b during opening and closing operations and, additionally, to allow door 21b to be pivoted about the vertical axis of hinge shaft 134b to facilitate access to hub bore 12 by employing use of door handle 120b. Hinge assembly 31b can comprise upper and lower bearing blocks 33b and 34b, respectively, operatively coupled to 11b and can either be coupled to hub 11b with fasteners, or integral to the structure of hub 11b. In some embodiments, door 21b can comprise hinge arm 236 to operatively coupled door 21b to hinge shaft 134b. In some embodiments, hinge arm 236 can comprise hinge bearings 39b to provide smooth rotational movement about hinge shaft 134b. Hinge arm 236 can further comprise thrust washers 38b disposed on an outer surface of bearings 39b, and held in place by stop collars 37b. Each end of hinge shaft 134b can be threaded, and have nut 135b threaded thereupon. Coarse adjustment of door 21b positioning within the vertical plane can be achieved by loosening stop collars 37b and moving door 21b to an approximate desired vertical position and then tightening stop collars 37b into position, with fine adjustment for raising or lowering door 21b by adjusting nuts 135b on both ends of hinge shaft 134b.

With reference to FIGS. 7b and 8b, upper and lower bearing blocks 33b and 34b (lower bearing block 34b not shown) can be operatively coupled to hub 11b, as described above. Hinge shaft 134b can be disposed inside adjustment collar 149b. The outside of collar 149b can comprise of oppositely arranged planar edges 137b, 138b, 139b and 140b. In some embodiments, upper and lower bearing blocks 33b and 34b can comprise oppositely arranged screws 141, 142, 143 and 144 located with threaded holes arranged radially with hinge shaft 134b axis that can contact edges 137b, 138b, 139b and 140b. By loosening and alternately tightening opposing screws 141, 142, 143 and 144, axis hinge shaft 134b and, by extension, door contact face 29, can be tilted in minute increments to achieve parallelism between hub contact face 28 and door contact face 29, and concentricity between the circular outer edges of hub male flange 14 and door male flange 22. In some embodiments, circular dished cap 145b can be installed over upper and lower bearing blocks 33b and 34b and be retained by a plurality of screws.

Figure 9A:
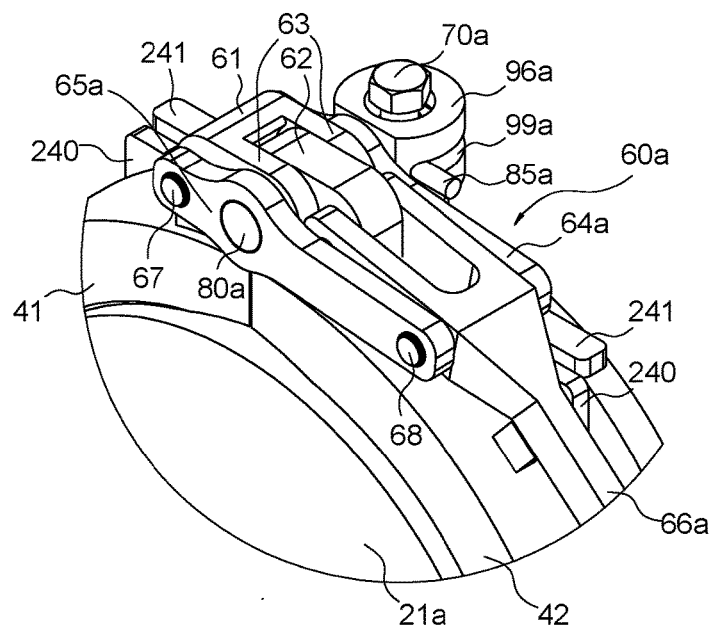
FIG. 9a is a close-up perspective view depicting the toggle mechanism/locking pin arrangement of the closure assembly of FIG. 1a in a closed and locked position, as viewed from the anterior end.
Figure 10A:
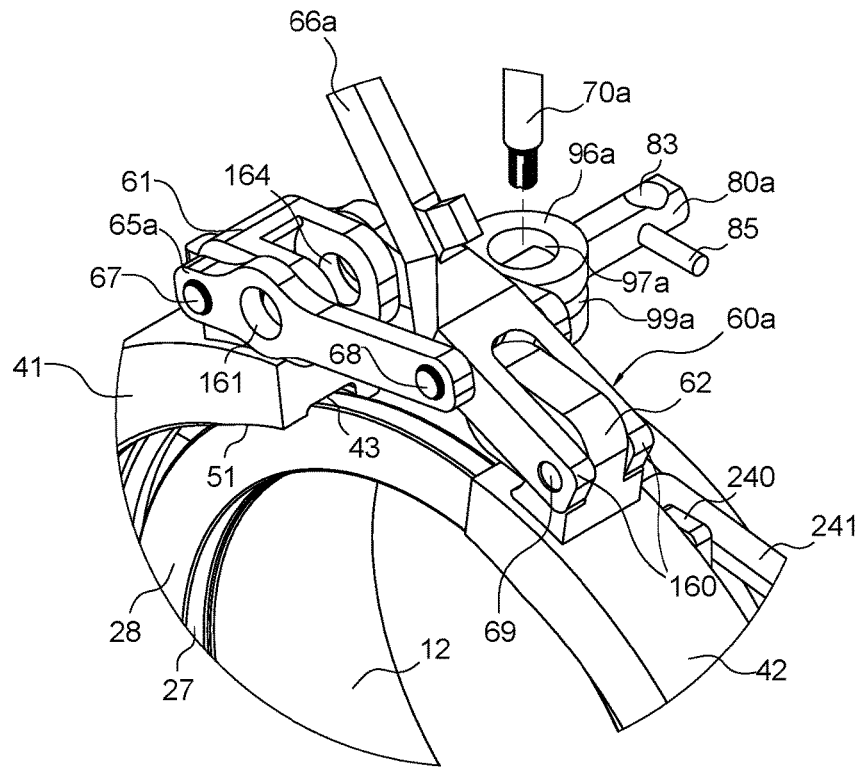
FIG. 10a is a close-up perspective view depicting the toggle mechanism/locking pin arrangement of the closure assembly of FIG. 1a in an open and unlocked position, as viewed from the anterior end.

FIGS. 9a, 10a, 11a and 12a illustrate, in some embodiments for use with closure assembly 10a, an over-center toggle mechanism attached to the top of split annular ring 41 and 42, which can function to move split annular ring 41 and 42 into its locked position, and to expand split annular ring 41 and 42 into the unlocked position through rotation about pivot pin 150. Toggle block 61 can be mounted radially on one half of split annular ring 41 on the end opposite pivot block 43a, as shown in FIG. 1a. Likewise, toggle block 62 can be mounted radially on one half of the annular ring 42 on the end opposite pivot block 44a. In some embodiments, toggle block 61 can comprise two tines 63 that can accept the body of toggle block 62 during the locking operation, as shown in FIG. 9a. Toggle blocks 61, 62 can further comprise through-hole 164 that can align axially when split annular ring 41 and 42 are in the closed and locked position, and parallel with the axis of hub 11a. In some embodiments, toggle handle 66a can comprise tines 160 that can straddle toggle block 62. Toggle linkages 64a, 65a can be installed on either side of toggle blocks 61, 62. In some embodiments, toggle pin 67 can be inserted through holes provided by toggle linkage 64a, 65a and toggle block 61. Toggle pin 68 can be inserted through holes provided by toggle linkage 64a, 65a and toggle handle 66a. Toggle pin 69 can be inserted through holes provided by toggle block 62 and toggle handle 66a. During the action of pivoting toggle handle 66a about the axis of toggle pin 69, toggle linkages 64a, 65a can, subsequently, pivot about toggle pins 67, 68 forcing the split annular ring 41 and 42 to pivot about pivot pin 150. Toggle linkages 64a, 65a can comprise through-hole 161 that can align axially with hole 164 on toggle blocks 61, 62 when split annular ring 41 and 42 are in the closed and locked position and is parallel with the axis of hub 11a.

Figure 9B:
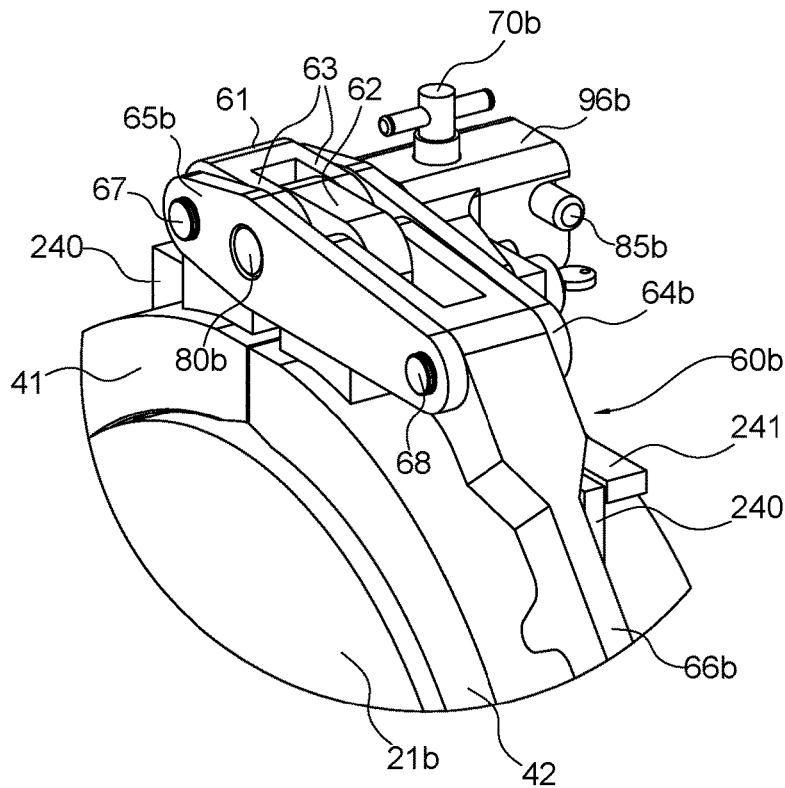
FIG. 9b is a close-up perspective view depicting the toggle mechanism/locking pin arrangement of the closure assembly of FIG. 1b in a closed and locked position, as viewed from the anterior end.
Figure 10B:
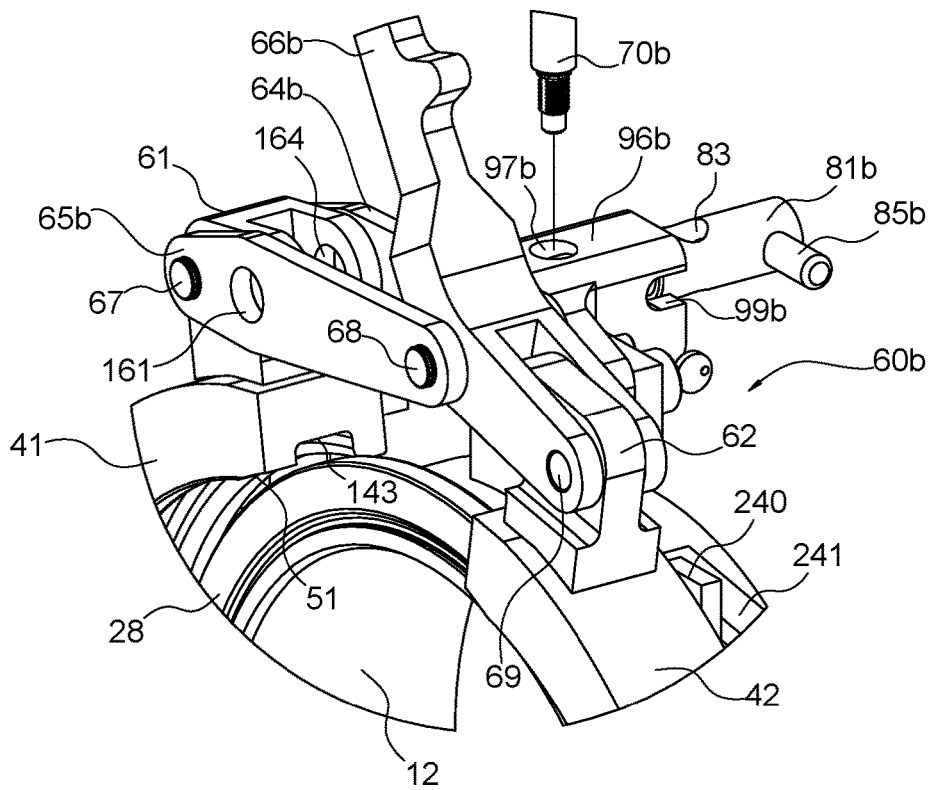
FIG. 10b is a close-up perspective view depicting the toggle mechanism/locking pin arrangement of the closure assembly of FIG. 1b in an open and unlocked position, as viewed from the anterior end.

FIGS. 9b, 10b, 11b and 12b illustrate, in some embodiments for use with closure assembly 10b, an over-center toggle mechanism attached to the top of split annular ring 41 and 42, which can function to move split annular ring 41 and 42 into its locked position, and to expand split annular ring 41 and 42 into the unlocked position through rotation about pivot pin 150. Toggle block 61 can be mounted radially on one half of split annular ring 41 on the end opposite pivot block 43b, as shown in FIG. 1b. Likewise, toggle block 62 can be mounted radially on one half of the annular ring 42 on the end opposite pivot block 44b. In some embodiments, toggle block 61 can comprise two tines 63 that can accept the body of toggle block 62 during the locking operation, as shown in FIG. 9b. Toggle blocks 61, 62 can further comprise through-hole 164 that can align axially when split annular ring 41 and 42 are in the closed and locked position, and parallel with the axis of hub 11b. In some embodiments, toggle handle 66b can comprise tines 160 that can straddle toggle block 62. Toggle linkages 64b, 65b can be installed on either side of toggle blocks 61, 62. In some embodiments, toggle pin 67 can be inserted through holes provided by toggle linkage 64b, 65b and toggle block 61. Toggle pin 68 can be inserted through holes provided by toggle linkage 64b, 65b and toggle handle 66b. Toggle pin 69 can be inserted through holes provided by toggle block 62 and toggle handle 66b. During the action of pivoting toggle handle 66b about the axis of toggle pin 69, toggle linkages 64b, 65b can, subsequently, pivot about toggle pins 67, 68 forcing the split annular ring 41 and 42 to pivot about pivot pin 150. Toggle linkages 64b, 65b can comprise through-hole 161 that can align axially with hole 164 on toggle blocks 61, 62 when split annular ring 41 and 42 are in the closed and locked position and is parallel with the axis of hub 11b.

Figure 15A:
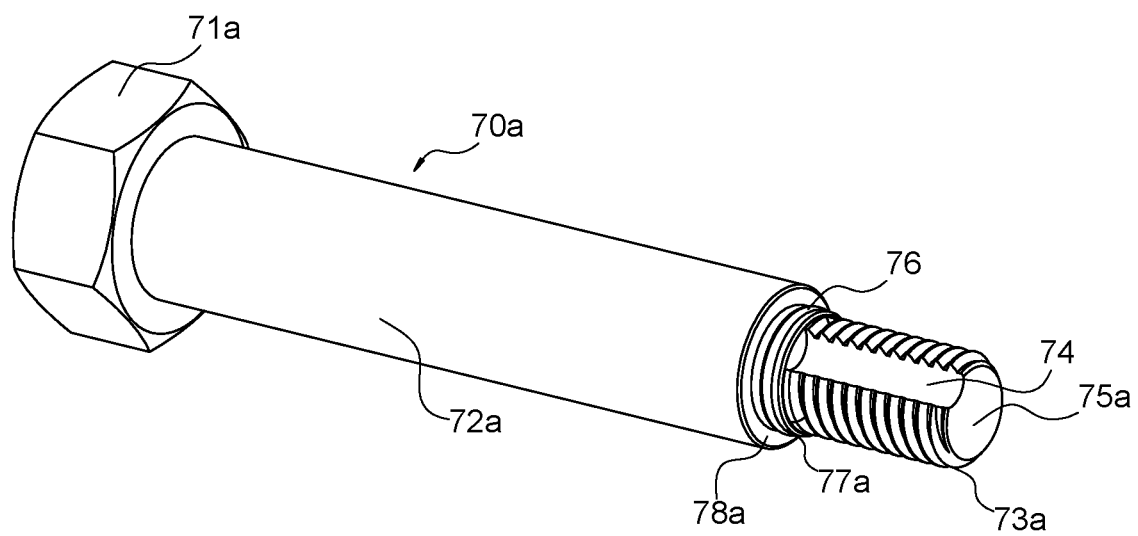

Referring to FIG. 15a, in some embodiments, closure assembly 10a can comprise pressure alert stem 70a, further comprising of hexagonal body 71a sized to accept industry standard imperial wrench sizes, cylindrical extension 72a and threaded body 73a on the end opposite hexagonal body 71a. In some embodiments, threaded body 73a can comprise longitudinal groove 74 parallel with pressure alert stem 70a axis. Longitudinal groove 74 can extend from threaded body end 75a to o-ring seal groove 77a at a depth equal to or greater than the root diameter of the thread. An appropriately sized o-ring 76 can be passed over threaded body 73a and installed into o-ring groove 77a adjacent end surface 78a.

Figure 15B:
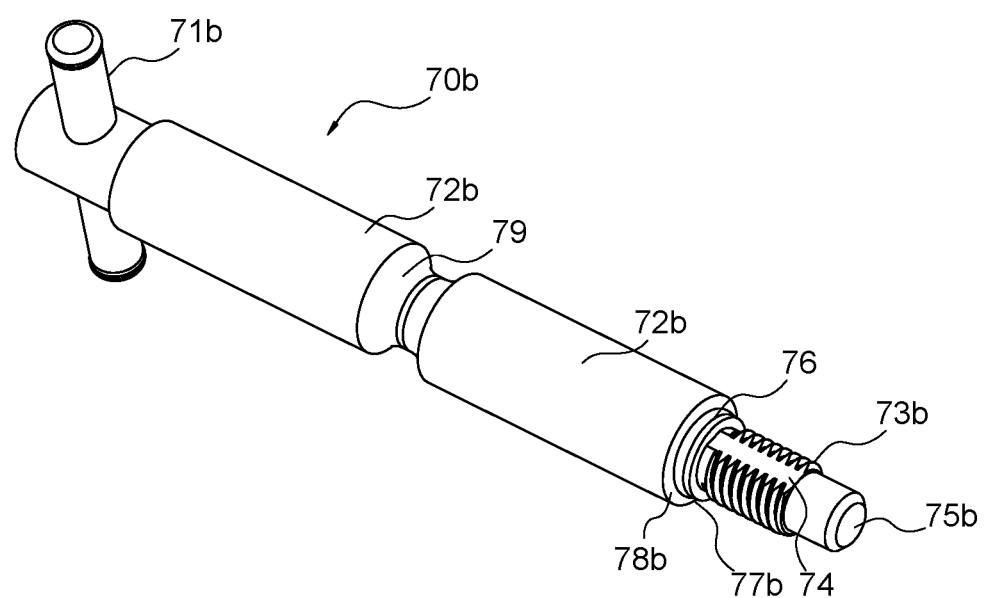
FIG. 15b is a perspective view depicting a pressure alert stem for use with the closure assembly of FIG. 1b.

Referring to FIG. 15b, in some embodiments, closure assembly 10b can comprise pressure alert stem 70b, further comprising of tee-shaped head 71b configured to turned by hand wherein pressure alert stem 70b can be tightened hand-tight and not over-torqued with a wrench. Pressure alert stem 70b can further comprise cylindrical extension 72b and threaded body 73b on the end opposite tee-shaped head 71b. Cylindrical extension 72b can further comprise circumferential groove 79 disposed therearound. In some embodiments, threaded body 73b can comprise longitudinal groove 74 parallel with pressure alert stem 70b axis. Longitudinal groove 74 can extend from threaded body end 75b to o-ring seal groove 77b at a depth equal to or greater than the root diameter of the thread. An appropriately sized o-ring 76 can be passed over threaded body 73b and installed into o-ring groove 77b adjacent end surface 78b.

Figure 16A:
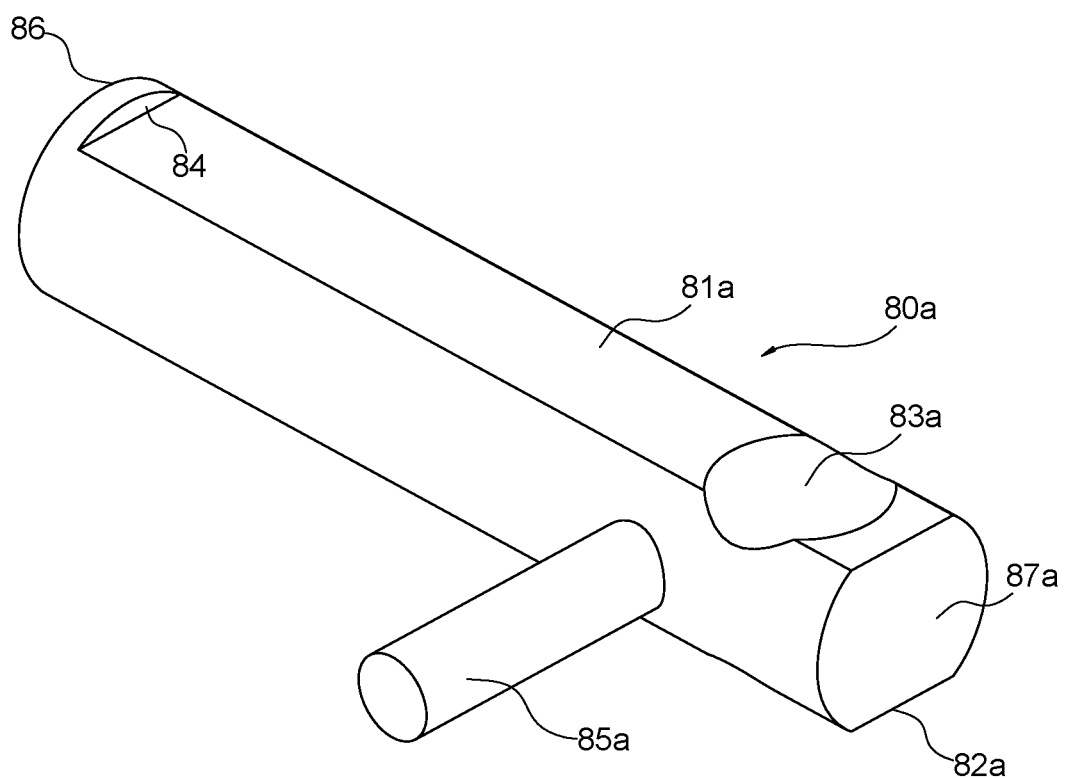

Referring to FIG. 16a, closure assembly 10a can comprise locking pin 80a, further comprising of a cylindrical body provided with two planar and parallel surfaces 81a, 82a extending the length of locking pin 80a up to stop lip 84. Pin end 86 can remain circular. In some embodiments, through hole 83a can be disposed through locking pin 80a near end 87a, and can be sized to accept the passage of pressure alert stem 70a. Locking pin handle 85a can be attached to the cylindrical sidewall surface of locking pin 80a and disposed near through hole 83a, wherein locking pin handle 85a can extend away from locking pin 80a in a plane substantially parallel to surfaces 81a, 82a.

Figure 16B:
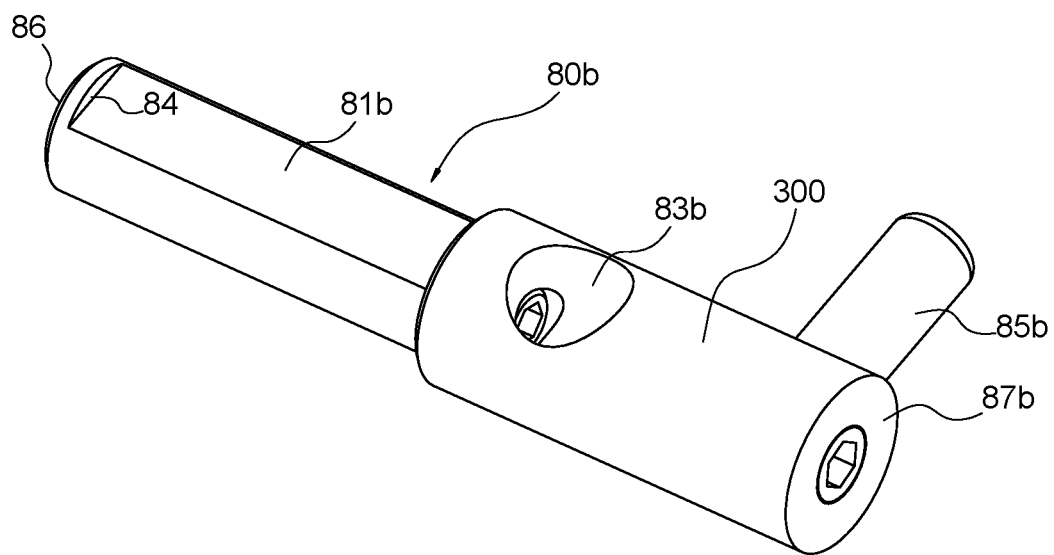
FIG. 16b is a perspective view depicting a locking pin for use with the closure assembly of FIG. 1b.

Referring to FIG. 16b, closure assembly 10b can comprise locking pin 80b, further comprising of a cylindrical body provided with a planar surface 81b extending the length of locking pin 80b up to stop lip 84. Pin end 86 can remain circular. In some embodiments, through hole 83b can be disposed through cylindrical portion 300 of locking pin 80b, and can be sized to accept the passage of pressure alert stem 70b. Locking pin handle 85b can be attached to cylindrical portion 300 and disposed near through hole 83b, wherein locking pin handle 85b can extend away from locking pin 80b in a plane substantially parallel to surface 81b.

Figure 12A:
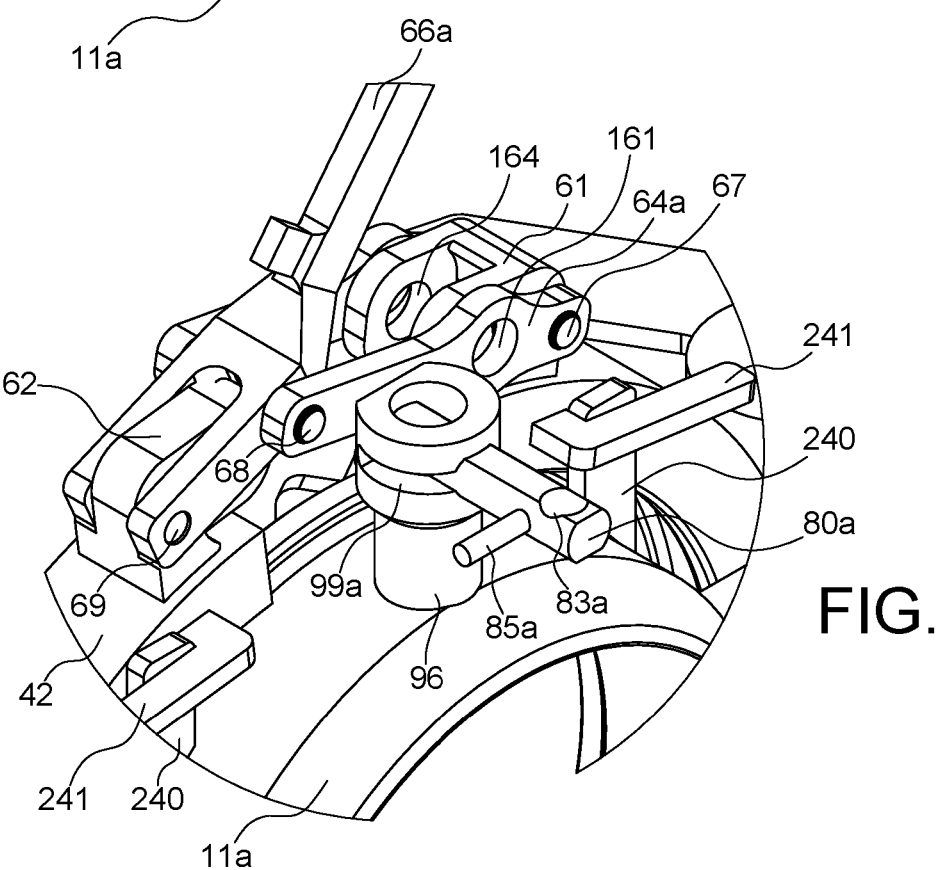
FIG. 12a is a close-up perspective view depicting the toggle mechanism/locking pin arrangement of the closure assembly of FIG. 1a in an open and unlocked position, as viewed from the posterior end.
Figure 13A:
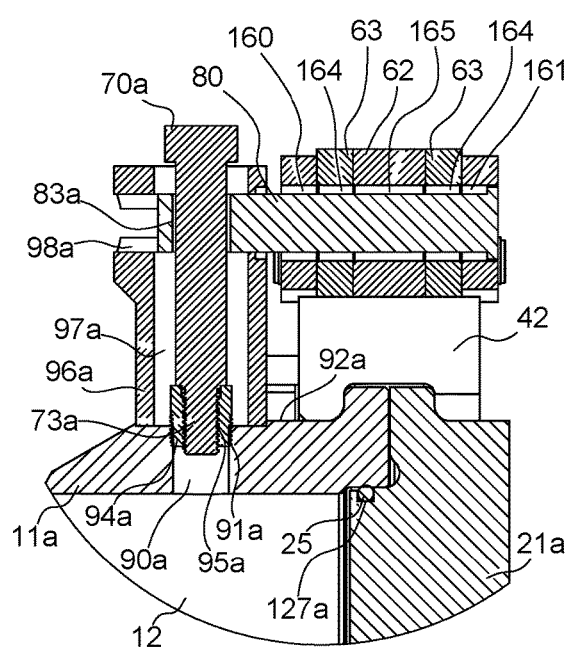
FIG. 13a is a close-up side elevation cross-section view of the closure assembly of FIG. 5a along section lines 3-3.
Figure 14A:
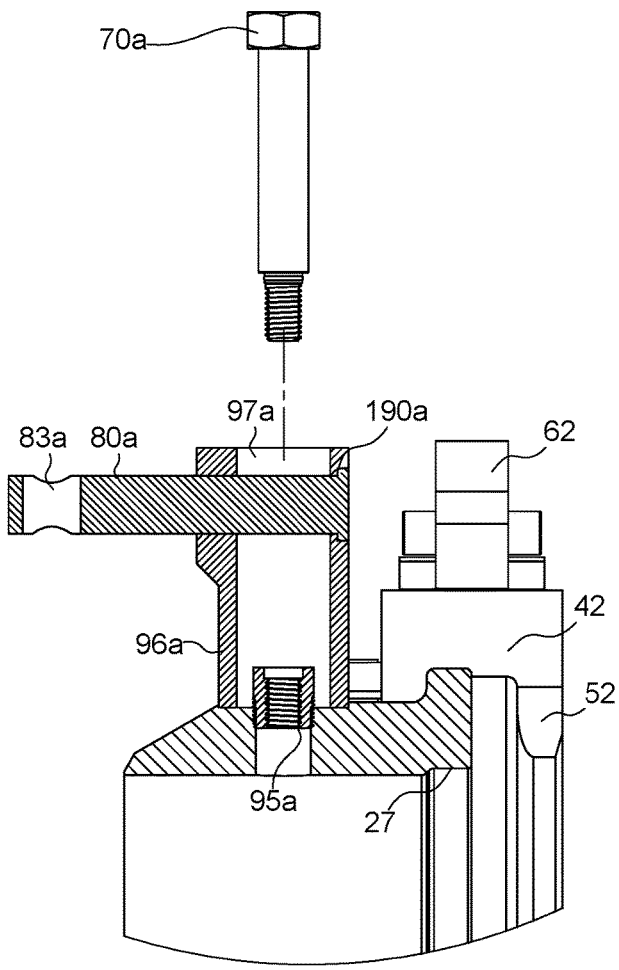
FIG. 14a is a close-up side elevation cross-section view of the closure assembly of FIG. 6a along section lines 4-4.

Referring to FIGS. 13a and 14a, in some embodiments, radial hole 90a can be provided in hub 11a having straight or taper thread 91a located towards outer surface 92a of hub 11a. Threaded bushing 94a, comprising an external straight or tapered thread matching straight or tapered thread 91a, and straight internal thread 95a matching the size of threaded body 73a of pressure alert stem 70a, can be installed into radial hole 90a. Stem housing 96a can be attached radially to outer surface 92a of hub 11a with longitudinal hole 97a concentric to radial hole 90a. In some embodiments, stem housing 96a can comprise radial hole 98a relative to longitudinal hole 97a that can further comprise a profile identical to end profile 87a of lock pin 80a, and can be parallel to the axis of hub 11a. In some embodiments, slot 99a (as shown in FIGS. 11a and 12a) can be perpendicular to radial hole 98a and longitudinal hole 97a, and can further extend into longitudinal hole 97a and be sized to accept locking pin handle 85a.

Referring to FIGS. 13a and 14a, the safety features and characteristics of closure assembly 10a are shown. With toggle mechanism 60a, split annular ring 41 and 42 and door 21a in the closed position, toggle linkage holes 160 and 161, toggle block holes 164 and 165, and stem housing radial hole 98a can align along a common axis and, thus, allow locking pin 80a to be installed until locking pin handle 85a contacts the end of slot 99a (as shown in FIGS. 11a and 12a) of pressure alert stem housing 96a, thus inhibiting the movement and function of toggle mechanism 60a and split annular ring 41 and 42. Pressure alert stem 70a can be inserted through longitudinal hole 97a, through locking pin hole 83a, up to threaded bushing 94a. Pressure alert stem 70a can then be threaded into threaded bushing 94a until stem end surface 78a contacts threaded bushing 94a and pressure alert stem o-ring 76 is confined within threaded bushing 94a effecting a seal.

Figure 12B:
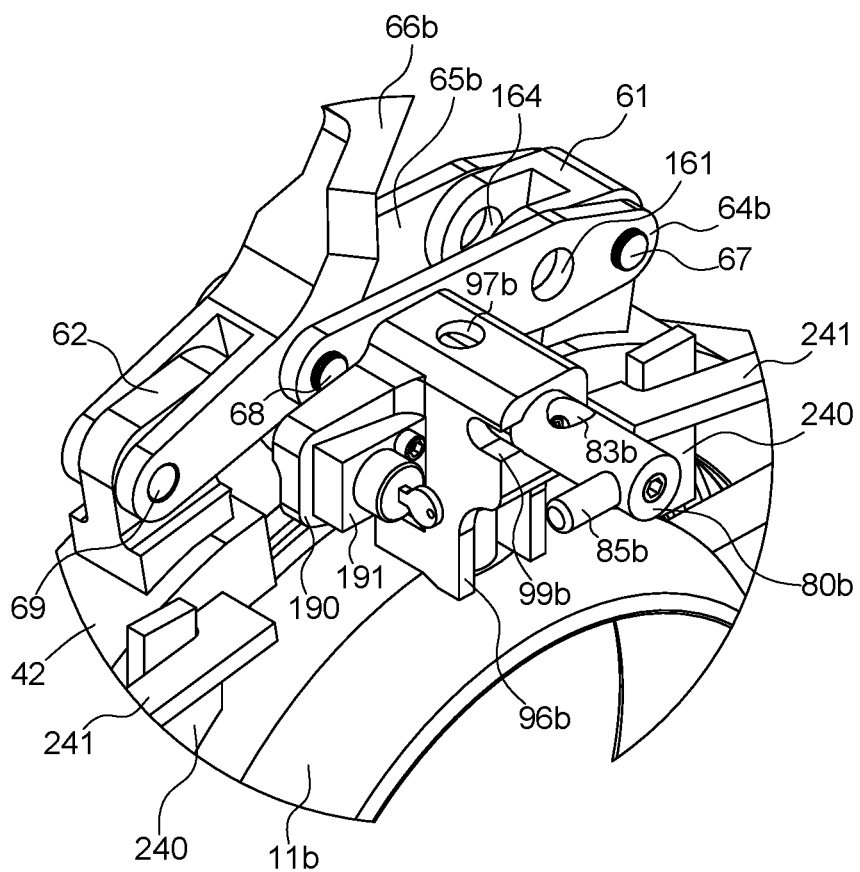
FIG. 12b is a close-up perspective view depicting the toggle mechanism/locking pin arrangement of the closure assembly of FIG. 1b in an open and unlocked position, as viewed from the posterior end.
Figure 13B:
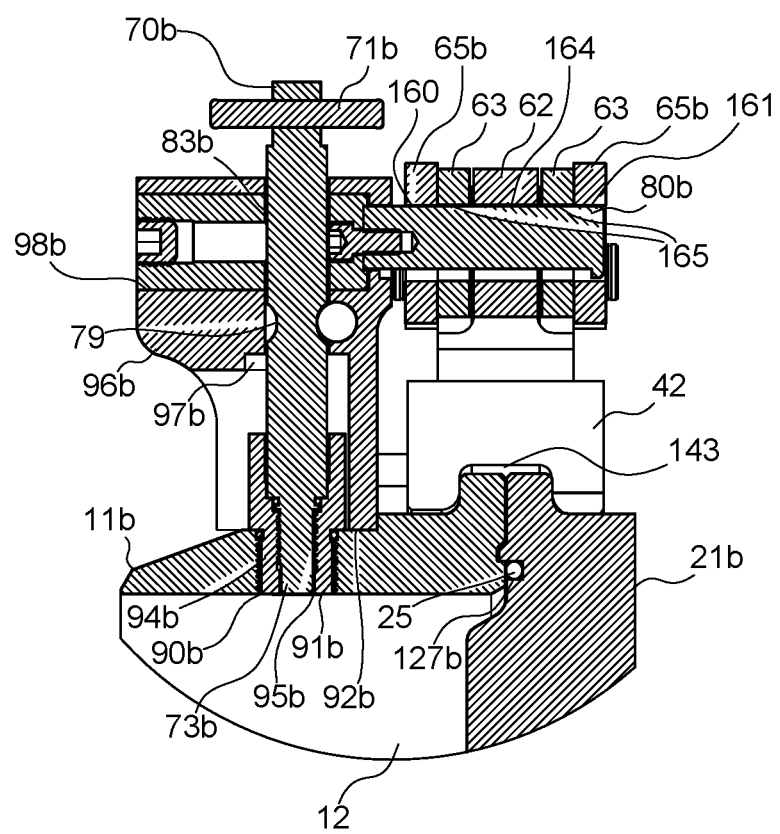
FIG. 13b is a close-up side elevation cross-section view of the closure assembly of FIG. 5b along section lines 3-3.
Figure 14B:
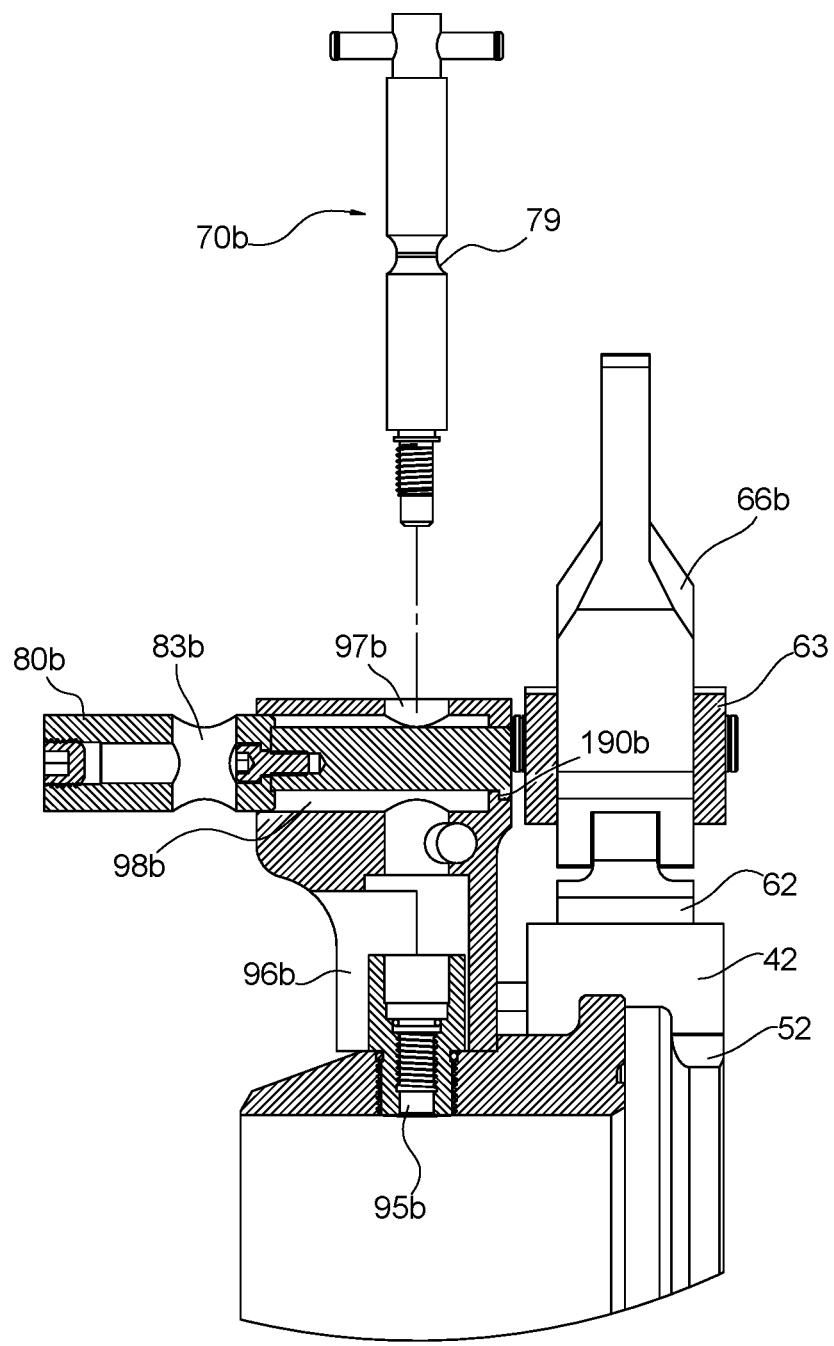
FIG. 14b is a close-up side elevation cross-section view of the closure assembly of FIG. 6b along section lines 4-4.

Referring to FIGS. 13b and 14b, in some embodiments, radial hole 90b can be provided in hub 11b having straight or taper thread 91b located towards outer surface 92b of hub 11b. Threaded bushing 94b, comprising an external straight or tapered thread matching straight or tapered thread 91b, and straight internal thread 95b matching the size of threaded body 73b of pressure alert stem 70b, can be installed into radial hole 90b. Stem housing 96b can be attached radially to outer surface 92b of hub 11b with longitudinal hole 97b concentric to radial hole 90b. In some embodiments, stem housing 96b can comprise radial hole 98b relative to longitudinal hole 97b that can further comprise a profile identical to end profile 87b of lock pin 80b, and can be parallel to the axis of hub 11b. In some embodiments, slot 99b (as shown in FIGS. 11b and 12b) can be perpendicular to radial hole 98b and longitudinal hole 97b, and can further extend into longitudinal hole 97b and be sized to accept locking pin handle 85b.

Referring to FIGS. 13b and 14b, the safety features and characteristics of closure assembly 10b are shown. With toggle mechanism 60b, split annular ring 41 and 42 and door 21b in the closed position, toggle linkage holes 160 and 161, toggle block holes 164 and 165, and stem housing radial hole 98b can align along a common axis and, thus, allow locking pin 80b to be installed until locking pin handle 85b contacts the end of slot 99b (as shown in FIGS. 11b and 12b) of pressure alert stem housing 96b, thus inhibiting the movement and function of toggle mechanism 60b and split annular ring 41 and 42. Pressure alert stem 70b can be inserted through longitudinal hole 97b, through locking pin hole 83b, up to threaded bushing 94b. Pressure alert stem 70b can then be threaded into threaded bushing 94b until stem end surface 78b contacts threaded bushing 94b and pressure alert stem o-ring 76 is confined within threaded bushing 94b effecting a seal.

Referring to FIG. 18, pressure alert stem 70b is shown being inserted into longitudinal hole 97b. Disposed in recess 194 pressure alert stem housing 96b can be lock mechanism 191. As shown in FIG. 18, when key 192 is turned to the "unlock" position as shown, locking pin 193 retracts into lock mechanism 191, as shown. Referring to FIG. 19, pressure alert stem 70b is shown fully inserted in longitudinal hole 97b, wherein key 192 can be turned to the "lock" position (as shown) thereby causing locking pin 193 to extend from lock mechanism 191 into groove 79 of pressure alert stem 70b thereby preventing pressure alert stem 70b from being removed from longitudinal hole 97b thus locking closure assembly 10b.

Figure 17:
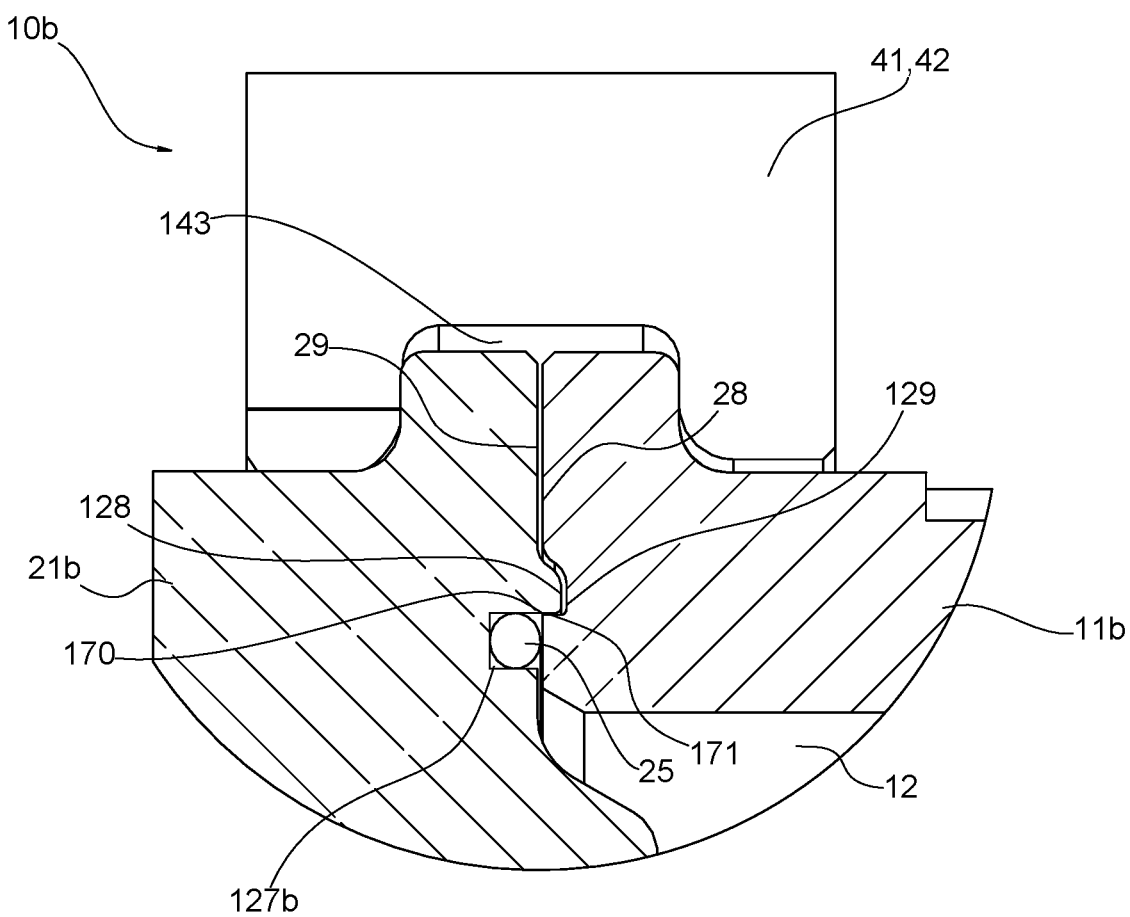
FIG. 17 is a close-up cross-section view depicting the closure assembly of FIG. 2b.

In some embodiments, closure assembly 10b can comprise an alternate sealing configuration, as shown in FIG. 17. In some embodiments, hub 11b can comprise concentric recess 129 disposed therearound about hub bore 12, wherein recess 129 is configured to receive concentric protrusion 128 disposed adjacent groove 127b disposed on door 21b. Protrusion 128 and recess 129 can comprise complimentary profiles wherein protrusion 128 is disposed in recess 129 when door 21b is closed and joined together with hub 11b by split annular rings 41 and 42, and wherein protrusion edge 170 overlaps with ledge 171 of recess 129. As gas or fluid pressures increase within hub bore 12 within closure assembly 10b, the pressure can urge door 21b away from hub 11b. As this occurs, protrusion 128 can partially retract from recess 129 but still maintain retention of o-ring seal 25 within groove 127b. Without this configuration of protrusion 128 and recess 129, excessive pressure within closure assembly 10b could otherwise cause o-ring seal 25 to expand outward from groove 127b into the interstitial gap between door 21b and hub 11b, thus resulting in a breach in the seal therebetween.

With the embodiments in the foregoing fully engaged, closure actuation is prevented until it can be verified no differential pressure exists within hub bore 12. To accomplish this, pressure alert stem 70a or 70b can be rotated counter clockwise until o-ring seal 76 backs out of threaded bushing 94a or 94b. If differential pressure exists within hub bore 12, the media (liquid and/or gas) present within hub 11a or 11b would expel through longitudinal groove 74, alerting the operator of a differential pressure condition within hub 11a or 11b. With o-ring seal 76 broken and media venting, threaded body 73a or 73b would still be sufficiently engaged to prevent pressure alert stem 70a or 70b from being expelled out of longitudinal hole 97a or 97b, thus preventing harm to the operator. When alerted to a differential pressure situation within hub 11a or 11b, the operator can then rotate pressure alert stem 70a or 70b clockwise to re-seal o-ring 76 within threaded bushing 94a or 94b and follow procedures to reduce the differential pressure to zero.

If, during the counter clockwise rotation of pressure alert stem 70a or 70b and breaking of o-ring seal 76, that no differential pressure is observed, pressure alert stem 70a or 70b may be fully extracted from threaded bushing 94a or 94b as well as from locking pin hole 83a or 83b and finally out of stem housing 96a or 96b. Only then can locking pin 80a or 80b be disengaged by sliding the pin longitudinally through toggle linkage holes 160 and 161, toggle block holes 164 and 165, and stem housing radial hole 98a or 98b until stop lip 84 enters circular recess 190a or 190b within stem housing 96a or 96b effecting cessation of locking pin 80a or 80b movement. Toggle mechanism 60a or 60b can then be actuated causing split annular ring 41 and 42 to rotate around pivot pin 150 and allow door 21a or 21b to rotate about hinge shaft 134a or 134b axis.

In some embodiments, locking pin 70a or 70b can provide an additional advantage over the prior art in that it can incorporate an extra layer of redundancy to the holding characteristics of toggle mechanism 60a or 60b. If, in the event that a failure should occur in one or more features of toggle mechanism 60a or 60b, locking pin 70a or 70b would remain engaged within toggle blocks 61 and 62, thereby reducing the possibility of split annular ring 41 and 42 movement and door 21a or 21b opening while hub 11a or 11b contains differential pressure.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

I claim:

1. A closure device for a pressure vessel or a pipeline, the closure device comprising:
   a) a hub comprising a central opening configured to correspond to an opening in the pressure vessel or pipeline;
   b) a door configured to contact the hub and close access to the hub central opening;
   c) a hinge assembly operatively coupling the door to the hub, wherein the hinge assembly further comprises:
      i) upper and lower blocks operatively coupled to the door, further comprising a plain pin and a threaded adjustment pin arrangement configured to manipulate a vertical location of the door in relation to the central opening,
      ii) upper and lower flange plates operatively coupled to the upper and lower blocks on the door, and further comprising a gusset body disposed between the upper and lower flange plates,
      iii) a hinge shaft; and
      iv) a hinge adjustment assembly operatively coupling the upper and lower flange plates to the hinge shaft, the hinge adjustment assembly configured to manipulate a position of the door relative to the hub, wherein the hinge assembly can support the door and allow rotation of the door about the hinge shaft;
   d) a split annular ring assembly operatively coupled attached to the hub and further comprising opposing ring sections configured to move between an open position to a closed position, the opposing ring sections each comprising an inner channel configured to engage corresponding flange elements disposed on both the door and the hub;
   e) an actuating mechanism configured to cause the split annular ring assembly to engage the flange elements thereby fastening the door to the hub;
   f) a locking pin configured to inhibit movement of the actuating mechanism when the actuating mechanism is in a locked position; and
   g) a pressure alert assembly operatively coupled to the hub, the pressure alert assembly configured to inhibit movement of the locking pin when the actuating mechanism is in the locked position.

2. The closure device as set forth in claim 1, further comprising a seal disposed between the door and the hub.

3. The closure device as set forth in claim 1, wherein the hub is configured to be welded or bolted to the pressure vessel or the pipeline.

4. The closure device as set forth in claim 1, wherein the hinge shaft comprises an axis that ranges from being substantially vertical to substantially horizontal.

5. The closure device as set forth in claim 1, wherein the actuating mechanism further comprises:
 a) blocks attached to each of the opposing ring sections, each block comprising a longitudinal through-hole comprising an axis substantially parallel with a plane defined by the split annular ring assembly, wherein the longitudinal through-holes of the blocks substantially align with each other when the opposing ring sections are in the closed position;
 b) toggle linkages disposed on anterior and posterior sides of a first of the blocks operatively coupling the first of the blocks to a toggle handle, the toggle handle operatively coupling a second of the blocks to the toggle linkages, the toggle handle configured to move the opposing ring sections between the open and closed positions; and
 c) wherein the toggle linkages further comprise second longitudinal through-holes configured to align with the longitudinal through-holes of the blocks when the opposing ring sections are in the closed position.

6. The closure device as set forth in claim 5, wherein the locking pin further comprises:
 a) a cylindrical member comprising a diameter substantially corresponding to the longitudinal through-holes of the blocks and the toggle linkages, the cylindrical member comprising a largely circular cross-section further comprising at least one planar surface configured to inhibit rotation of the locking pin when disposed in a supporting housing comprising an opening disposed therethrough having a similar cross-section as the locking pin;
 b) a bolt hole disposed through the locking pin, the axis of the bolt hole substantially perpendicular to the axis of the locking pin, the bolt hole disposed at a location offset from a first end of the locking pin;
 c) a lip of circular cross section disposed at a second end of the locking pin; and
 d) a radial handle extending substantially perpendicular from the locking pin near the first end thereof, the radial handle extending along a plane substantially parallel to the at least one planar surface.

7. The closure device as set forth in claim 6, wherein the bolt hole is configured for allowing a locking bolt to pass therethrough and prevent the locking pin from moving within the supporting housing.

8. The closure device as set forth in claim 7, wherein the locking bolt comprises a pressure alert stem operatively coupled to the hub.

9. The closure device as set forth in claim 5, wherein the pressure alert assembly further comprises:
 a) a stem housing operatively coupled to the hub, the stem housing further enclosing a radial hole disposed through the hub to provide communication with an interior of the pressure vessel or the pipeline;
 b) a threaded bushing disposed in the radial hole, the threaded bushing configured to threadably receive an interrupted thread of a pressure alert stem, the threaded bushing further comprising a sealing surface to contact an o-ring seal disposed on the pressure alert stem; and
 c) a third longitudinal through-hole disposed through the annular external housing, the third longitudinal through-hole substantially aligned with the longitudinal through-holes of the blocks and with the second longitudinal through-hole when the opposing ring sections are in the closed position.

10. The closure device as set forth in claim 9, further comprising the locking pin disposed in the longitudinal through-holes when the opposing ring sections are in the closed position, the locking pin further comprising a stem hole disposed through the locking pin, the axis of the stem hole substantially perpendicular to the axis of the locking pin, the stem hole disposed at a location offset from a first end of the locking pin and configured to have the pressure alert stem pass therethrough when the pressure alert stem is threaded into the threaded bushing thereby preventing the locking pin from being removed from the longitudinal through-holes without first removing the pressure alert stem from the threaded bushing.

11. The closure device as set forth in claim 10, wherein the interrupted thread is configured to close off communication to the interior of the pressure vessel or the pipeline when the pressure alert stem is fully threaded and seated in the threaded bushing, and to provide communication to the interior of the pressure vessel or the pipeline when the pressure alert stem is at least partially unthreaded from the threaded bushing.

12. The closure device as set forth in claim 9, wherein the pressure alert stem comprises a tee-shaped handle.

13. The closure device as set forth in claim 9, wherein the pressure alert assembly further comprises a key lock assembly comprising a retractable locking pin configured to engage a circumferential groove disposed around the pressure alert stem.

14. The closure device as set forth in claim 1, further comprising a pressure vessel, wherein the hub is welded to the pressure vessel.

15. The closure device as set forth in claim 1, further comprising a pressure vessel, wherein the hub is bolted to the pressure vessel.

16. The closure device as set forth in claim 1, further comprising a pipeline, wherein the hub is welded to the pipeline.

17. The closure device as set forth in claim 1, further comprising a pipeline, wherein the hub is bolted to the pipeline.

* * * * *